United States Patent [19]
Rockstein et al.

[11] Patent Number: 5,424,525
[45] Date of Patent: Jun. 13, 1995

[54] PORTABLE BAR CODE SYMBOL READING DEVICE WITH BAR CODE SYMBOL DETECTION CIRCUIT FOR ACTIVATING MICROPROCESSOR IMPLEMENTED BAR CODE SYMBOL DECODER

[75] Inventors: George B. Rockstein, Audubon; David M. Wilz, Sr., Sewell; David P. Bubnoski, Glassboro; Carl H. Knowles, Moorestown, all of N.J.

[73] Assignee: Metrologic Instruments, Inc., Blackwood, N.J.

[21] Appl. No.: 147,833

[22] Filed: Nov. 4, 1993

Related U.S. Application Data

[63] Continuation of Ser. No. 583,421, Sep. 17, 1990, Pat. No. 5,260,553.

[51] Int. Cl.$^6$ .............................................. G06K 7/10
[52] U.S. Cl. .................................... 235/462; 235/472
[58] Field of Search ................ 235/462, 463, 466, 472

[56] References Cited

U.S. PATENT DOCUMENTS

| | | |
|---|---|---|
| D. 305,885 | 6/1988 | Barkan et al. . |
| D. 307,894 | 12/1988 | Siemiatkowski . |
| 3,911,270 | 8/1974 | Traub . |
| 3,978,317 | 2/1975 | Yamaguchi et al. . |
| 4,072,859 | 10/1976 | McWaters . |
| 4,086,476 | 7/1976 | King . |
| 4,136,821 | 7/1977 | Sugiura et al. . |
| 4,240,064 | 9/1978 | DevChoudhury . |
| 4,387,297 | 2/1980 | Swartz et al. . |
| 4,409,470 | 1/1982 | Shepard et al. . |
| 4,431,912 | 11/1982 | Dickson et al. . |
| 4,460,120 | 8/1983 | Shepard et al. . |
| 4,496,831 | 11/1983 | Swartz et al. . |
| 4,521,678 | 1/1984 | Winter . |
| 4,570,057 | 8/1984 | Chadima, Jr. et al. . |
| 4,575,625 | 9/1984 | Knowles . |
| 4,603,262 | 10/1984 | Eastman et al. . |
| 4,639,606 | 10/1984 | Boles et al. ............... 235/462 X |
| 4,673,085 | 4/1985 | Shepard et al. . |
| 4,736,095 | 2/1986 | Shepard et al. . |
| 4,766,297 | 1/1987 | McMillan . |
| 4,766,299 | 3/1987 | Tierney et al. . |

(List continued on next page.)

FOREIGN PATENT DOCUMENTS

| | | |
|---|---|---|
| 0424097 | 10/1990 | European Pat. Off. . |
| 0424976 | 10/1990 | European Pat. Off. . |
| 6389988 | 10/1986 | Japan . |
| 63-52277 | 3/1988 | Japan . |
| 2-159687 | 6/1990 | Japan . |

OTHER PUBLICATIONS

"Hand-Held Holographic Scanner Having Highly Visible Locator Beam" by R. T. Cato, published in IBM Technical Disclosure Bulletin, vol. 27, No. 4A, Sep. 1984, pp. 2021-2022.

*Primary Examiner*—Donald Hajec
*Assistant Examiner*—Michael G. Lee
*Attorney, Agent, or Firm*—Hopgood, Calimafde, Kalil & Judlowe

[57] ABSTRACT

An automatic bar code symbol reading system comprising components for carrying out object detection, scanning, photoreceiving, A/D conversion, bar code presence detection, symbol decoding, data format conversion, data storage and data transmission functions. In general, the bar code symbol reading device includes a control system having a plurality of control centers that control the operation of the system components in accordance with preselected system control operations. Each of the control centers are responsive to control activation signals generated by certain of the system components upon the occurrence of predefined conditions. Certain of the control centers are capable of overriding other control centers to provide diverse control capabilities which facilitates execution of intelligent operations and power consumption, during bar code symbol reading.

48 Claims, 10 Drawing Sheets

U.S. PATENT DOCUMENTS

| | | |
|---|---|---|
| 4,816,660 | 5/1988 | Swartz et al. . |
| 4,825,057 | 1/1988 | Swartz et al. . |
| 4,845,349 | 9/1988 | Cherry . |
| 4,855,581 | 8/1989 | Mertel et al. ............ 235/463 |
| 4,877,949 | 8/1989 | Danielson et al. . |
| 4,897,532 | 9/1989 | Swartz et al. . |
| 4,930,848 | 9/1989 | Knowles . |
| 4,933,538 | 10/1989 | Heiman et al. ............ 235/462 |
| 4,970,379 | 10/1989 | Danstrom . |
| 5,017,765 | 12/1989 | Shepard et al. . |
| 5,059,777 | 9/1990 | Wittensoldner et al. . |
| 5,086,215 | 10/1990 | Carsner et al. . |
| 5,107,100 | 11/1990 | Shepard et al. . |
| 5,180,904 | 10/1991 | Shepard et al. . |
| 5,216,231 | 8/1992 | Ouchi . |
| 5,250,790 | 6/1993 | Metlitsky . |
| 5,272,323 | 12/1993 | Martino ............ 235/462 |
| 5,280,162 | 6/1994 | Marwin . |

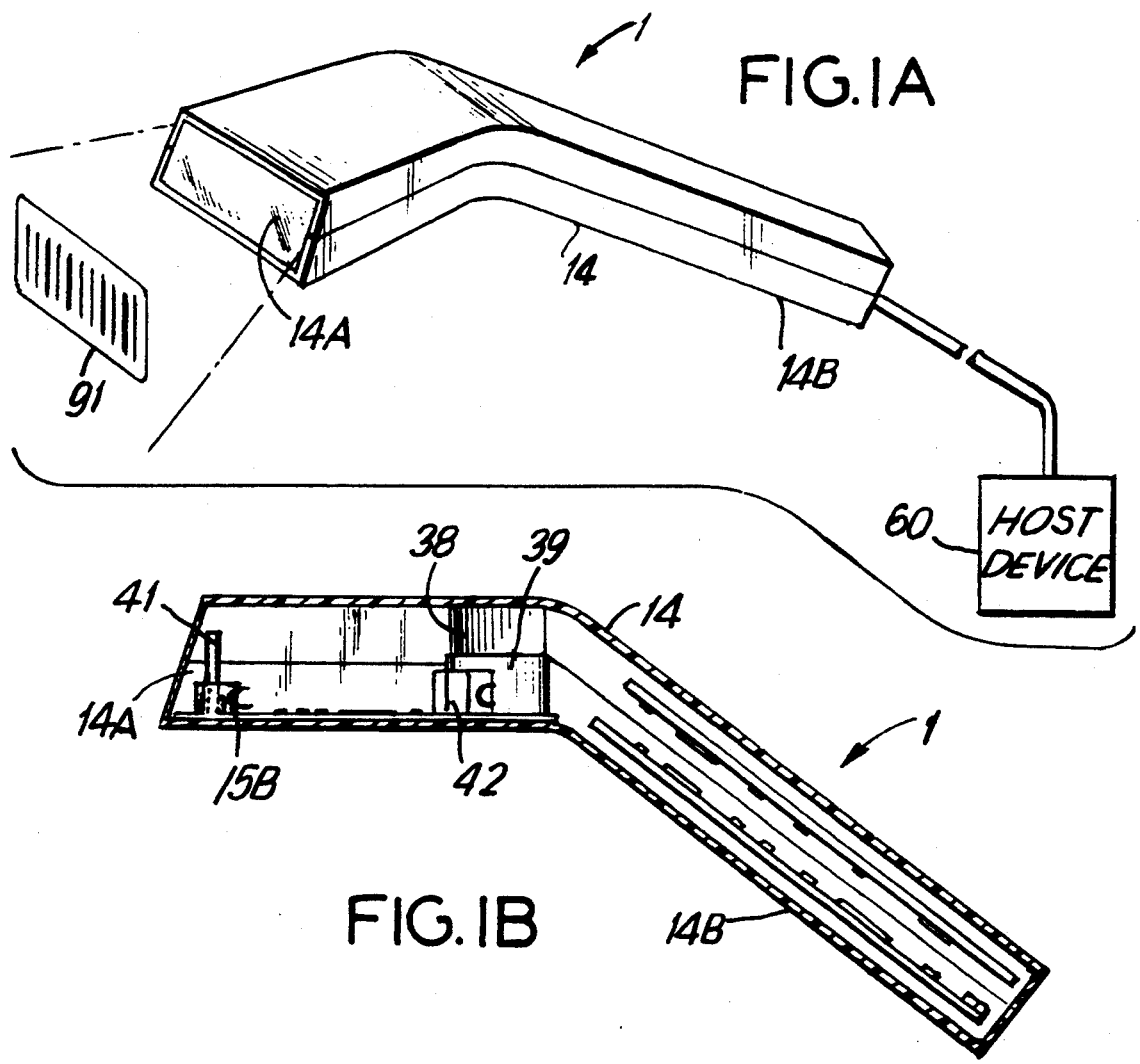
FIG.1A
FIG.1B
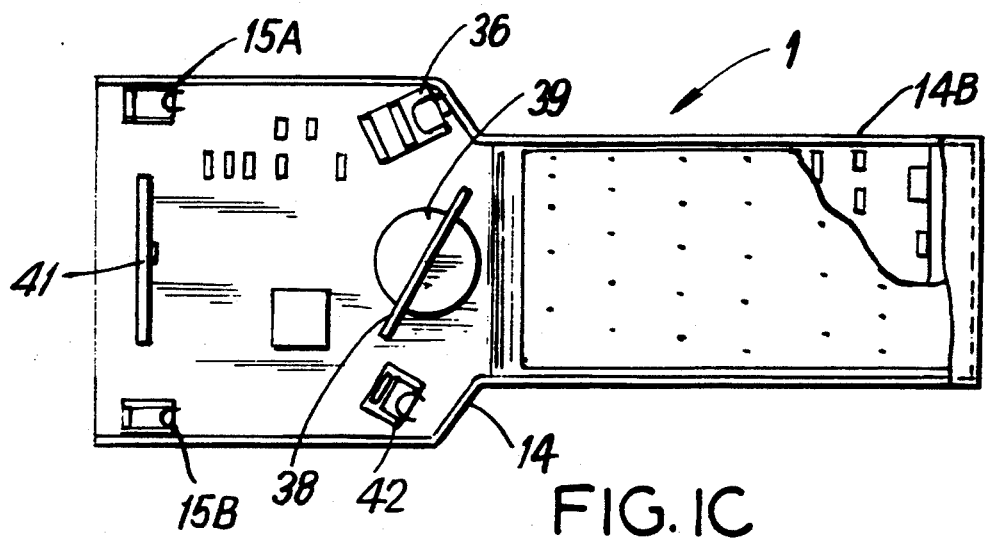
FIG.1C

PORTABLE BAR CODE SYMBOL READING DEVICE WITH BAR CODE SYMBOL DETECTION CIRCUIT FOR ACTIVATING MICROPROCESSOR IMPLEMENTED BAR CODE SYMBOL DECODER

This application is continuation of Ser. No. 07/583,421, filed Sep. 17, 1990, now U.S. Pat. No. 5,260,533.

BACKGROUND OF THE INVENTION

1. Field of the Invention

The present invention relates generally to automatic code symbol reading (i.e. recognition) systems, and more particularly to an automatic code symbol reading device having a control system which permits multiple modes of fully automated operation while conserving power and providing versatility in its method of use.

2. Brief Description of the Prior Art

Hitherto, a number of techniques have been proposed for reading bar code symbols using hand-held devices. Despite variety amongst prior art bar code symbol reading devices, the various techniques incorporated into prior art devices can be classified into two principally distinct classes, namely, manually operated or triggered bar code symbol reading, and automatic bar code symbol reading.

Representative of prior art manually operated bar code symbol reading devices are U.S. Pat. Nos. 4,387,297 to Swartz, et al., 4,575,625 to Knowles, and 4,845,349 to Cherry. While such prior art devices are capable of successful bar code symbol reading, they nevertheless suffer from several significant shortcomings and drawbacks. In particular, the user is required to manually pull a trigger or push a button each time scanning and decoding is to be cyclically initiated and terminated. The requirement is most fatiguing on the user when large numbers of bar code symbols are to be read. Also, in certain symbol reading applications, such as warehouse inventory, pulling the trigger to initiate scanning of bar code symbols may be extremely difficult for the user due to the physical location of the objects bearing the bar code symbols.

An alternative to manually operated a bar code symbol reading devices is use of automatic bar code symbol readers, which incorporate techniques for automatically initiating and terminating scanning and decoding operations. Representative of prior art automatic bar code symbol devices are U.S. Pat. Nos. 4,639,606 to Boles, et al. and 4,933,538 to Heiman et al. While capable of automatically initiating scanning of bar code symbols, such prior art devices and incorporated techniques nevertheless also suffer from significant shortcomings and drawbacks.

In particular, U.S. Pat. No. 4,639,606 to Boles, et al. discloses laser emission control circuitry for use in implementing a hand-held triggerless bar code scanner. The laser is operated in a pulsed "find paper" mode until a reflected signal is obtained, indicating the presence of an object (e.g., paper) in the search field. Thereupon, the circuitry is changed to a "search mode" in which the power of the laser is increased to above the safety limits for a period of time, and the return signal is monitored for signal transitions corresponding to the black bars of the code. On detection of the first black bar, the circuitry is changed to an "in-code" (decode) mode as long as successive symbols are received within a given period of time. If the decode mode terminates within a predetermined time interval (e.g., one second after the beginning of the search mode), then the search mode is re-entered, otherwise the decode mode will change to find paper mode.

While the triggerless bar code symbol reader proposed in U.S. Pat. No. 4,639,606 possesses three modes of operation, this prior art bar code symbol reader nevertheless suffers from several significant shortcomings and drawbacks. In particular, this prior art bar code symbol reader requires continuous use of a pulsed laser beam to determine the presence of an object within the scan field, which, in hand-held portable battery power devices, undesirably drains limited power reserves, especially in extended time duration bar code reading applications. Also, this prior art device not knowing whether a bar code symbol is actually present in the scan field, requires commencement of decode processing upon detection of the first black bar. Undesirably, this typically necessitates powering and initializing a programmable device such as a microprocessor, for decoding scan data that may likely contain no bar cede symbol at all. Consequently, this characteristic of such prior art bar code symbol reading devices results in further consumption of power.

U.S. Pat. No. 4,933,538 discloses a bar code symbol scanning system, which in the "object sensor mode" the scanner is triggerless and the constantly on laser beam normally emits at a narrow angle and low power. When an indicia pattern indicative of a bar code symbol has been detected, the laser beam will widen, the power of the beam will increase, and the beam will read the entire symbol. While this prior art scanning technique permits detection of bar code symbols within the scan field in order that the power of the laser beam may be automatically increased to a higher level for collecting scan data for use in decoding operations, this prior art system nevertheless suffers from several significant shortcomings and drawbacks as well. In particular, this prior art system requires continuous use of laser emission to determine the presence of both objects and bar code symbols within the scan field, which necessarily results in drain of limited power reserves in portable battery power applications. In addition, the extensive use of a laser beam to perform object and bar code symbol detection functions implicates necessity for laser emission control measures.

In general, prior art automatic bar code symbol reading devices also suffer from other shortcomings and drawbacks. For example, unlike manually operated devices which rely on the user to activate a trigger, once for each bar code to be read, prior art triggerless (i.e., automatic) bar code symbol reading devices lack intelligence capabilities necessary to prevent undesired multiple reading of bar code symbols, particularly when the scanning beam is permitted to dwell on a bar code symbol for extended periods of time.

Further, prior art automatic bar code symbol reading devices have lacked control capabilities which permits diverse modes of programmable system-control operation, while preventing misreads and inadvertent multiple reads and ensuring conservation of power.

Thus, there is a great need in the code symbol reading art for a fully automatic code symbol reading device which overcomes the above shortcomings and drawbacks of prior art devices and techniques.

Accordingly, it is a primary object of the present invention to provide a fully automatic hand-holdable bar code symbol reading device capable of automatically reading bar code symbols in accordance with user-selectable system-control operations.

A further object of the present invention is to provide such an automatic bar code symbol reading device incorporating a control system having a plurality of control centers, each of which can be assigned predetermined control functions that enable operation of particular device components in accordance with a user-selected system-control operation.

A further object of the present invention is to provide such an automatic bar code symbol reading device, in which upon the occurrence of predetermined conditions, one or more of the control centers are capable of overriding certain of the other control centers so that a wide number of system-control operations can be carried out in a power conserving manner, to permit automatic reading of bar code symbols in a variety of diverse applications.

Another object of the present invention is to provide such an automatic bar code symbol reading device, in which the system control architecture readily permits extension of additional system-control operations by formulating and programming functions between a fixed number of control activation signals and enable signals provided as input and output signals respectively, to one or more control centers.

A further object of the present invention is to provide an automatic hand-holdable bar code symbol reading device which is capable of determining the presence of an object without enabling the scanning means of the device.

Another object of the present invention is to provide a hand-holdable bar code symbol reading device which is capable of distinguishing between a bar code symbol and a regular pattern of light and dark areas such as that formed by printed characters, and to only enable decode processing of scan data upon the detection of a bar code symbol in the scan field of the device. Consequently, the device is capable of disregarding all text within the scan field, and enabling the symbol decoder only by an actual bar code symbol.

An even further object of the present invention is to provide an automatic bar code symbol reading device which prevents multiple reading of bar code symbols due to dwelling of scanning beam upon a bar code symbol for an extended period of time.

Yet a further object of the present invention is to provide an improved method of automatically reading bar code symbols.

These and further objects of the present invention will become apparent hereinafter and in the claims.

SUMMARY OF THE INVENTION

According to one of the broader aspects of the present invention, there is provided a fully automatic hand-holdable bar code symbol reading system.

In general, the automatic bar code reading device comprises system activation means, scanning means, photoreceiving means, analog-to-digital conversion means, bar code presence detection means, and symbol decoding means. The purpose of the system activation means is to provide a first control activation signal indicative of the presence of an object in the scan field. The purpose of the scanning means is to produce a light beam and scan the light beam across the scan field. The purpose of the photoreceiving means is to detect at least a portion of light of variable intensity reflected off the object in the scan field and produce an analog signal indicative of the detected light intensity. The purpose of the analog-to-digital conversion means is to convert the analog data signal into a digital data signal indicative of the detected light intensity. The purpose of the bar code presence detection means is to produce a second control activation signal upon detecting the presence of a bar code symbol on the object in the scan field, on the basis of the analog or digital data signal. The purpose of the symbol decoding means, on the other hand, is to produce symbol character data and a third control activation signal upon decoding a bar code symbol on the basis of the digital data signal. Notably, the produced symbol character data will correspond to the decoded bar code symbol.

Another aspect of the present invention is to embed the above-described system components within a control system having individual control centers, each of which are responsive to particular control activation signals generated by the system components. In accordance with the architecture of the control system, certain of the control centers can override other control centers, providing a marked increase in system-control operation and versatility.

Based on the control system of the present invention, it is yet further possible to now read bar code symbols in a fully automatic manner without risk of inadvertent multiple reads and the like, owing to the fact the control architecture of the present invention provides intelligence capabilities to the system.

BRIEF DESCRIPTION OF THE DRAWINGS

For a fuller understanding of the objects of the present invention, the Detailed Description of the Preferred Embodiment will be taken in connection with the drawings, wherein:

FIG. 1A is a perspective view of an automatic hand-holdable laser bar code symbol reading device constructed in accordance with the principles of the present invention;

FIG. 1B is a cross-sectional elevated side view along the longitudinal extent of the bar code symbol reading device of FIG. 1A, showing various hardware and software components used in realizing the illustrated embodiment;

FIG. 1C is a cross-sectional plan view along the longitudinal extent of the bar code symbol reading device of FIGS. 1A and 1B, also showing the various components used in realizing the illustrated embodiment;

DETAILED DESCRIPTION OF THE PREFERRED EMBODIMENT

The automatic bar code symbol reading system 1 of the present invention, is generally illustrated in FIGS. 1 through 10.

Figure 2:
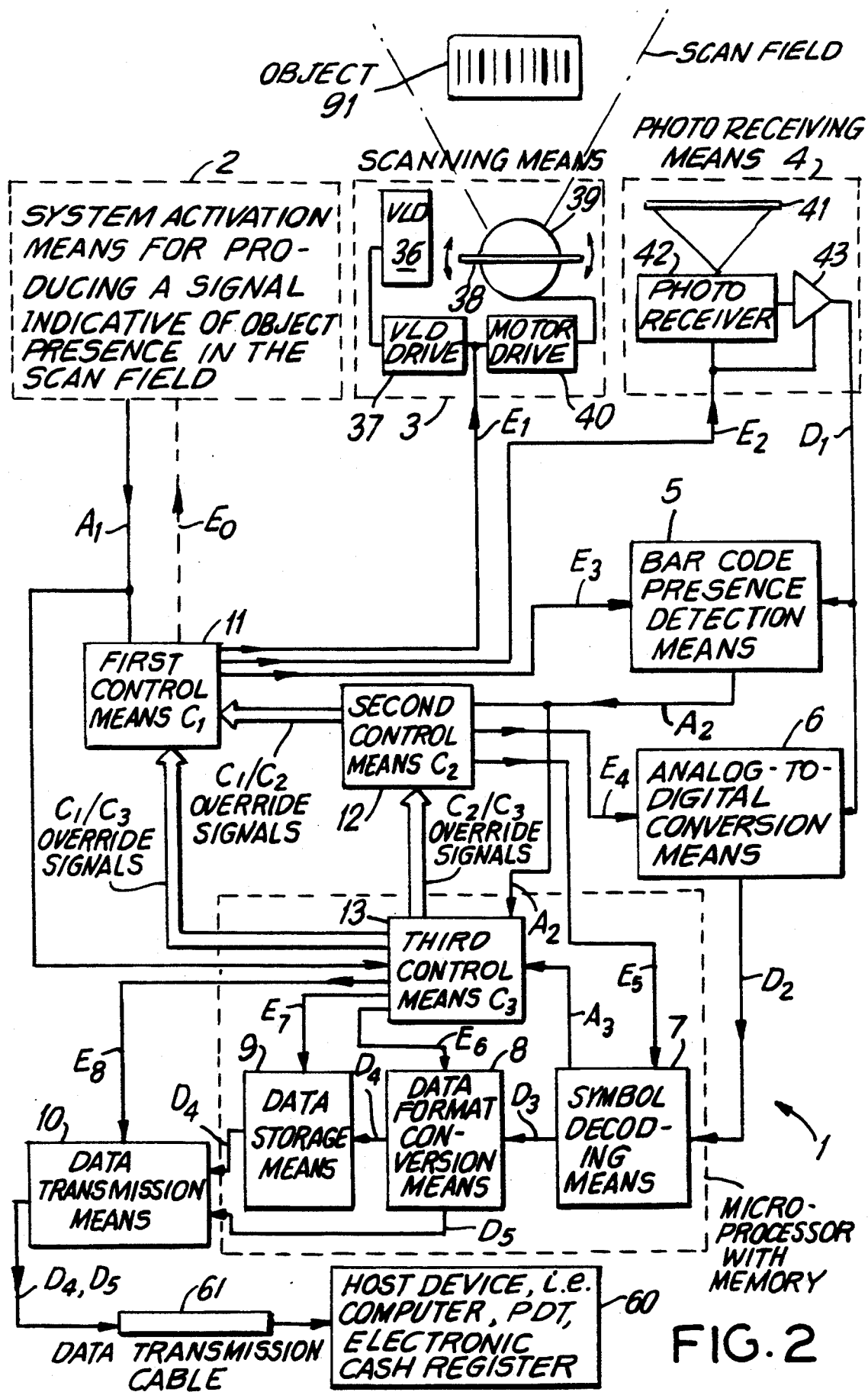
FIG. 2 is block functional system diagram of the bar code symbol reading device of the present invention, illustrating the principal components of the device as being integrated within the control system hereof.

As shown in FIG. 2, bar code symbol reading system 1 comprises a number of system components, namely, system activation means 2, scanning means 3, photoreceiving means 4, bar code presence detection means 5, analog-to-digital (A/D) conversion means 6, symbol decoding means 7, data format conversion means 8, symbol character data storage means 9, and data transmission means 10. As illustrated, these system components are embedded within a programmable control system having a unique architecture which provides a great degree of versatility in system capability and operation, as well as power conservation. The structure, function and advantages of this control system architecture will be described in great detail hereinafter.

The control system of the present invention comprises essentially three major components, namely first control means ($C_1$) 11, second control means ($C_2$) 12, and third control means ($C_3$) 13. As will be described in greater detail hereinafter, second control means 12 is capable of "overriding" (i e., exhibit and/or enable) first control means 11, whereas third control means 13 is capable of overriding second control means 12 and first control means 11. As shown in FIG. 2, such control override functions are carried out by the generation of control override signals (i.e., $C_1/C_2$, $C_1/C_3$, and $C_2/C_3$) transmitted between respective control structures.

While not illustrated in the drawings for purposes of clarity and avoidance of obfuscation, automatic bar code symbol reading device 1 includes a conventional power supply which is capable of providing requisite power to each of the system components, when and for time prescribed by the control system hereof. Typically, an on/off power switch or functionally equivalent device will be provided external to housing 14 to permit the user to turn on device 1. When power switch is initially engaged to its ON position, power will only be provided to system activation means 2 to enable its operation, while, for example, only biasing voltages and the like are provided to all other system components so that they are each initially disabled from operation.

Figure 3A:
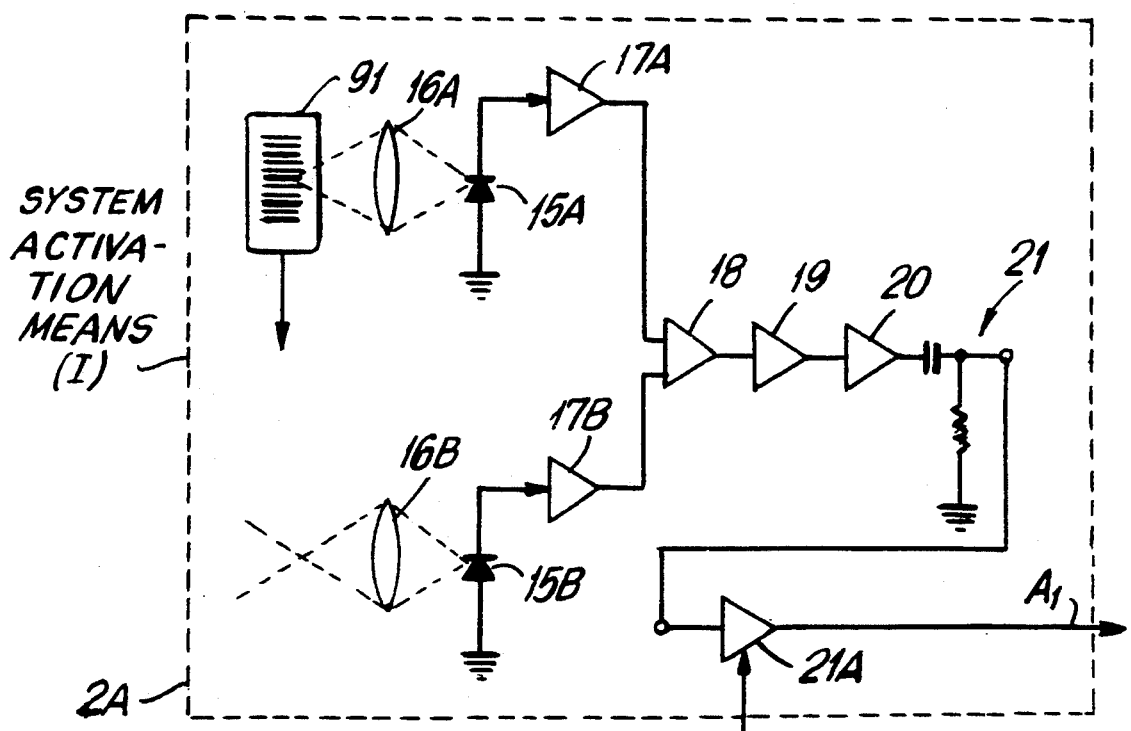
FIG. 3A is a block functional diagram of a first embodiment of the system activation means of the bar code symbol reading device of the present invention.
Figure 3B:
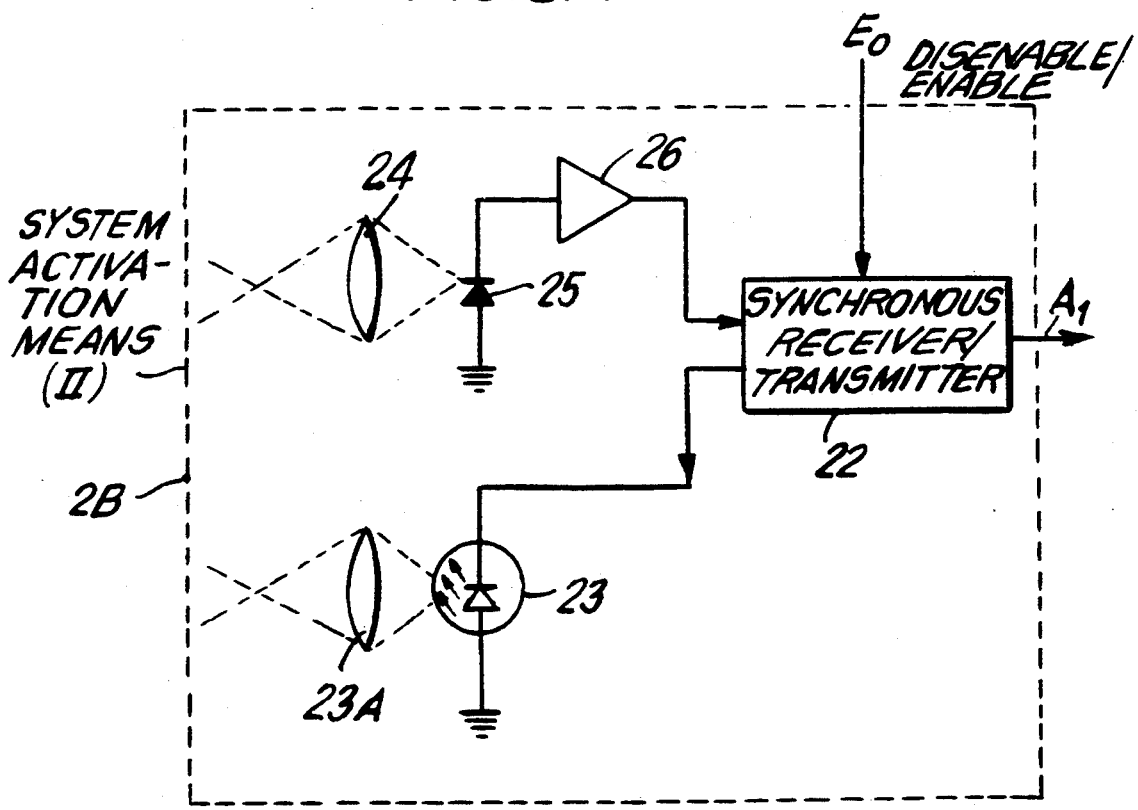
FIG. 3B is a block functional diagram of a second embodiment of the system activation means of the present invention.

In accordance with the present invention, the purpose of system activation means 2 is to produce first control activation signal $A_1$ upon determining (i.e., detecting) the presence of an object (e.g., product, document, etc.) within the scan field of bar code symbol reading device 1, as illustrated in FIG. 1A. In turn, first control activation signal $A_1$ is provided as input to both first and third control means 11 and 13, respectively. In FIGS. 3A and 3B, two different approaches to generating first control activation signal $A_1$ are disclosed.

In FIG. 3A, a passive technique is illustrated, in which passive detection of ambient light within the scan field is performed in order to determine if an object is present within the scan field of the automatic bar code symbol reading device 1. As illustrated in FIG. 3A, passive ambient light detection circuit 2A comprises a pair of photo diodes 15A and 15B, which sense ambient light gathered from two different parts of the scan field in front of device 1, using focussing lenses 16A and 16B, respectively. The output signals of photodiodes 15A and 15B are converted to voltages by current-to-voltage amplifiers 17A and 17B respectively, and are provided as input to a differential amplifier 18. The output of differential amplifier 18 is provided as input to a sample and hold amplifier 19 in order to reject 60 and 120 Hz noise. Output signal of amplifier 19 is provided as input to a logarithmic amplifier 20 to compand signal swing. The output signal of logarithmic amplifier 20 is provided as input to a differentiator 21 and then to a comparator 21. The output of comparator 21 provides first control activation signal $A_1$.

In FIG. 3B, an active technique is illustrated in which an infrared signal is transmitted out into the scan field and first control activation signal $A_1$ is generated upon receiving a reflection of the transmitted signal off an object within the scan field. As illustrated in FIG. 3B, infrared object detection circuit 2B comprises a synchronous receiver/transmitter 22, which includes an infrared LED 23 which generates a 900 nanometer pulsed signal at a rate of 2.0 KHZ. This pulsed signal is transmitted through focusing lens 23 to illuminate the scan field. When an object is present within the scan field, a reflected pulse signal is produced and focussed through focusing lens 24 onto photodiode 25. The output of photodiode is corrected to a voltage by current-to-voltage amplifier 26, and the output thereof is provided as input to receiver/transmitter 22, to synchronously compare the received signal with the transmitted signal and determine if an object is present in the scan field. If so, then synchronous receiver/transmitter 22 produces first control activation signal $A_1 = 1$ indicative of such condition. First control activation signal $A_1 = 1$ upon being generated activates first control means 11 which, in turn, enables operation of scanning means 3, photoreceiving means 4, and bar code presence detection means 5, as will be described in greater detail hereinafter. In order to conserve power and improve signal-to-noise ratio at photoreceiving means 4 during scan data collection operations, it is preferable for first control means 11 to generate and provide a disable signal $E_0$ to infrared object detection circuit 2B whenever first control means 11 enables the scanning means 3.

Figure 5:
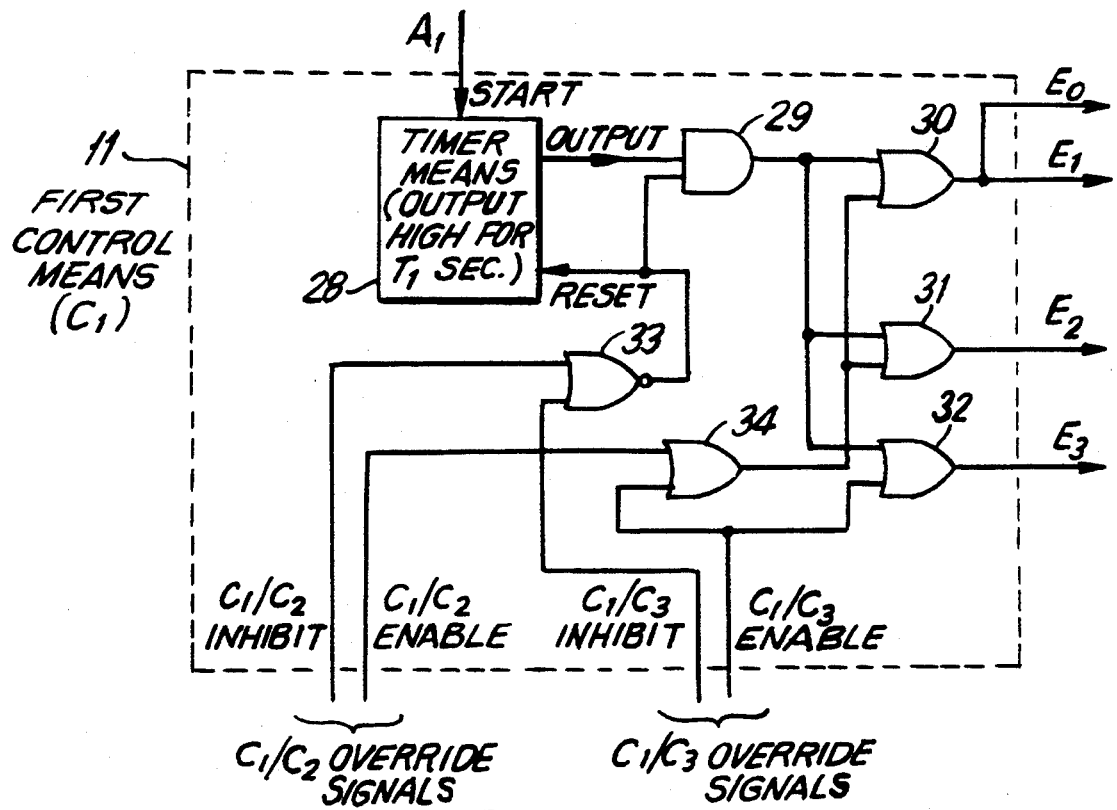
FIG. 5 is a logical functional diagram of the first control means of the control system of the present invention.

As illustrated in FIGS. 2 and 5, first control means 11 is preferably realized by a circuit capable of generating enabling signals $E_1$, $E_2$ and $E_3$ for the scanning means, photoreceiving means and bar code presence detection means, respectively. As will be described in detail hereinafter, the specific operation of first control means 11 is dependent on the state of three sets of input signals, namely, first control activation signal A, $C_1$ override signals from $C_2$ (i.e., $C_1/C_2$ inhibit signal and $C_1/C_2$ enable signal), and $C_1$ override signals from $C_3$ (i.e., $C_1/C_3$ inhibit signal and $C_1/C_3$ enable signal). As shown, first control activation control signal $A_1$ is provided to the "START" input of timer 28 upon which it produces a "high" output signal for a first predetermined time period (i.e., $T_1$ seconds). Preferrably, time period $T_1$ is selected to be about 0.3 seconds.

As illustrated in FIG. 5, the output signal of timer 28 is provided as an input to AND gate 29, with its other input connected to the RESET input of timer 28. The output of AND gate 29 is provided as an input to each of OR gates 30, 31 and 32. $C_1/C_2$ inhibit signal from second control means 12 and $C_1/C_3$ inhibit signal from third control means 13 are provided as inputs to NOR gate 33, whereas $C_1/C_2$ enable signal from second control means 12 and $C_1/C_3$ enable from third control means 13 are provided as inputs to OR gate 34. As shown, the output signal of OR gate 34 is provided to the other input of OR gates 30 and 31, whereas the output signal from NOR gate 33 is provided as input to AND gate 29. $C_1/C_3$ enable signal is also provided as input to OR gate 32, to complete the description of the circuit realization of first control means 11. As indicated in FIG. 5, the outputs of OR gates 30, 31 and 32 provide enable signals $E_1$, $E_2$ and $E_3$ for the scanning means, photoreceiving means and bar code presence detection means, respectively. Notably, disable signal $E_0$ is produced from the output of OR gate 30.

As illustrated in FIG. 2, scanning means 3 comprises a light source 36 which, in general, may be any source of intense light suitably selected for maximizing the reflectively from the object. In the preferred embodiment, light source 36 comprises a solid-state visible laser diode (VLD) which is driven by a conventional driver circuit 37. In order to deflect the laser beam output from laser diode 36 over a scan field having a predetermined spatial extend in front of front portion 14A of housing 14 in FIG. 1A, a conventional scanning mirror 38 can be oscillated back and forth by a stepper motor 39 driven by a conventional driver circuit 40, as shown. However, one of a variety of conventional scanning mechanisms may be alternatively used with excellent results. To selectively activate both laser light source 36 and motor 39, scanning means enable signal $E_1$ is provided as an input to both driver circuits 37 and 40. When enable signal $E_1$ is a logical "high" level (i.e., $E_1=1$), scanning means 3 is operable, a laser beam is generated and scanned across the scan field, and scan data is thereby produced off any object residing within the scan field.

In a conventional manner, when an object, such as product bearing a bar code symbol, is within the scan field at the time of scanning, the laser beam incident thereon will be reflected, producing a laser light return signal of variable intensity which represents a spatial variation of light reflectivity characteristic of the spaced apart pattern of bars comprising the bar code symbol. Photoreceiving means 4 is provided for the purpose of detecting at least a portion of laser light of variable intensity, which is reflected off the object and bar code symbol within the scan field. Upon such detection, photo receiving means 4 produces an analog data signal $D_1$ indicative of the detected light intensity. In general, photoreceiving means comprises scan data collection optics 41, such as a focusing mirror, which focus scan data signals for subsequent detection by a conventional photo receiver 42. Photoreceiver 42 in turn, produces an analog signal indicative of the intensity of the scan data signal, which is subsequently amplified by preamplifier 43 to produce analog scan data signal $D_1$. In combination, scanning means 3 and photoreceiving means 4 operate to generate scan data from the scan field, over time intervals specified by first control means 11 during normal (i.e., noncontrol-override) modes of operation, and by third control means 13 during "control override" modes of operation. As will illustrated hereinafter, this scan data is used by both bar code presence detection means 5 and symbol decoding means 6.

As illustrated in FIG. 2, analog scan data signal $D_1$ is provided as input to both bar code presence detection means 5 as well as A/D conversion means 6. The primary purpose of bar code presence detection means 5 is to determine whether a bar code is present in or absent from the scan field, over time intervals specified by first control means 11 during normal modes of operation and by third control means 13 during control override modes of operation. When the presence of a bar code symbol in the scan field is determined, the bar code presence detection means 5 generates second control activation signal $A_2$ (i.e., $A_2=1$) which is provided as input to second control means 12, as shown in FIG. 2.

Figure 4:
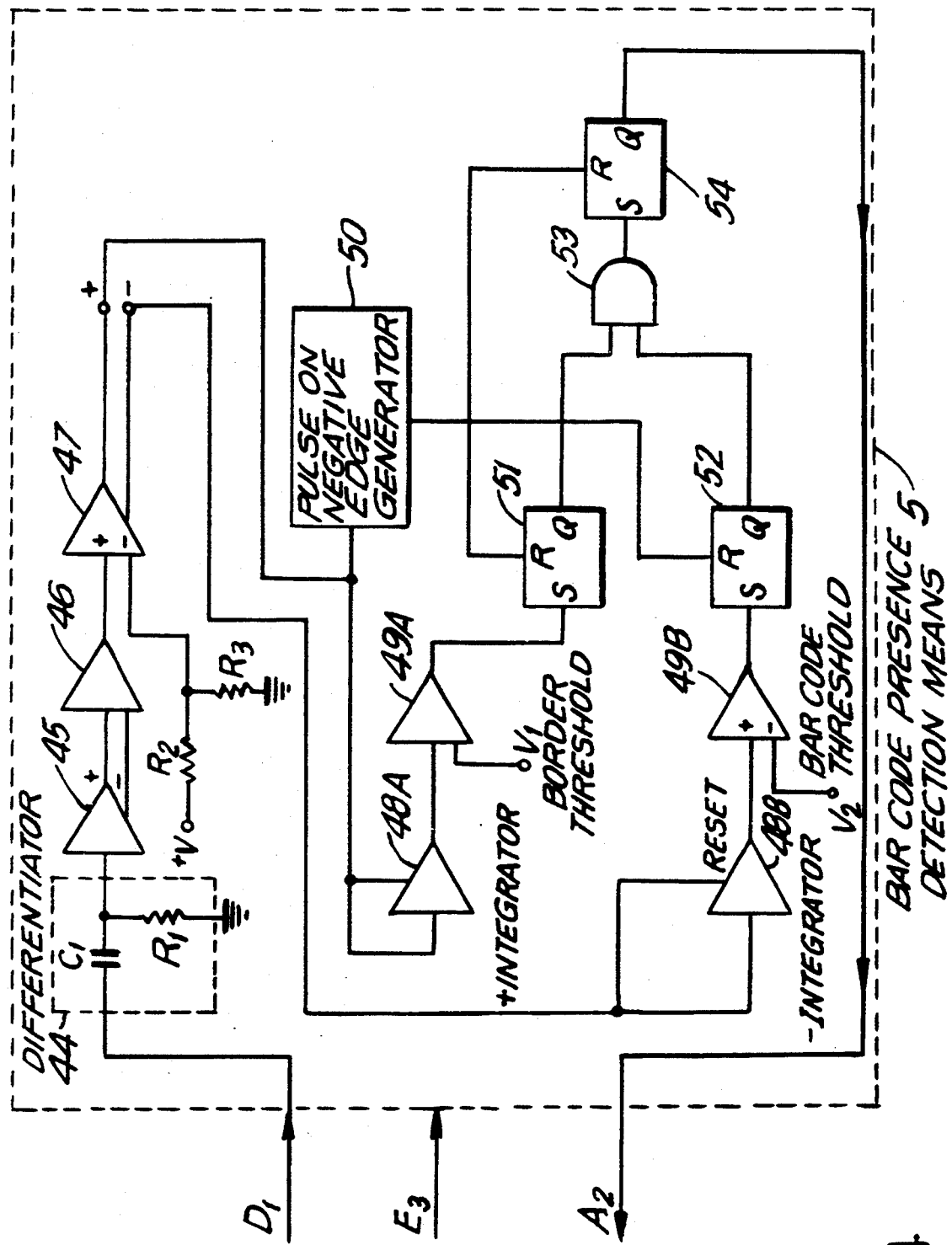
FIG. 4 is a block functional diagram of the bar code presence detection means of the bar code symbol reading device of the present invention.

As illustrated in FIG. 4, bar code presence detection means 5 is provided with enable signal $E_3$ which is used to enable circuitry employed in the realization of the bar code presence detection means. In the preferred embodiment, bar code presence detection means 5 is realized as a bar code envelope detector which processes analog scan data signal $D_1$ so as to produce a signal, the intensity of which indicates the general envelope of a bar code within the scan field. Upon such detection, bar code envelope detector 5 produces second control activation signal $A_2=1$ which is provided as input to second control means 12.

As shown in FIG. 4, analog scan data signal $D_1$ is provided as input to a differentiater 44 comprising capacitance element $C_1$ and resistive element $R_1$, to produce the first derivative signal of signal $D_1$. The first derivative signal is then amplified by a differential output amplifier 45, to produce as output amplified positive and negative first derivative signals, which in turn are provided as input to a positive peak detector 46. The output signal of positive peak detector 46 is provided as input to a compariter 47 which generates positive and negative bar code detect (BCD) signals.

As illustrated in FIG. 4, the positive and negative BCD signals are then provided as input and RESET signals to both integraters 48A and 48B. Positive BCD signal is also provided as input to pulse generator 50, which generates pulses upon the detection of the negative edges of the positive BCD signal. As shown, the output signals of integraters 48A and 48B are provided as first inputs to compariters 49A and 49B respectively, whereas an envelope border threshold voltage $V_1$ and bar code threshold voltage $V_2$ are provided as second inputs to compariters 49A and 49B, respectively. Boarder voltage $V_1$ is a DC reference voltage whose value can be determined on the basis of the time constant of intergrater 48A, its gain, and the time duration of the minimum required "boarder width" of the bar code symbol. Bar code threshold $V_2$ is also a DC reference voltage whose value can be determined on the basis of the time constant of intergrater 48B, its gain, and the time duration of the minimum required "bar code length".

The output of comparitors 49A and 49B are provided to the S gates of latches 51 and 52, respectively, and the Q gates of these latches are provided as inputs to AND gate 53, as shown in FIG. 4. The output of AND gate 53 is provided as input to the S gate of latch 54, whereas the R gate of latch 54 is connected to the R gate of latch 51. The output of pulse generator 50 is provided as input to the R gate of latch 52. The output of latch 54 provides second control activation signal $A_2$, which in turn, is provided as input to second control means 12, as shown in FIG. 2. The operation of the bar code envelope detector 5 is essentially as follows. If the output signals of both comparitors 49A and 49B go "high" before the next RESET pulse from pulse generator 50 is provided to latch 52, then the output of latch 54 will go "high" (i.e., $A_2 = 1$) indicating that a bar code is present in the scan field.

In general, when the presence of a bar code in the scan field is detected, second activation control signal $A_2$ is generated, second control means 12 is activated and first control means 11 is overridden by second control means 12 through the transmission of control override signals (i.e., $C_1/C_2$ inhibit and $C_1/C_2$ enable signals) from the second control means.

Figure 6:
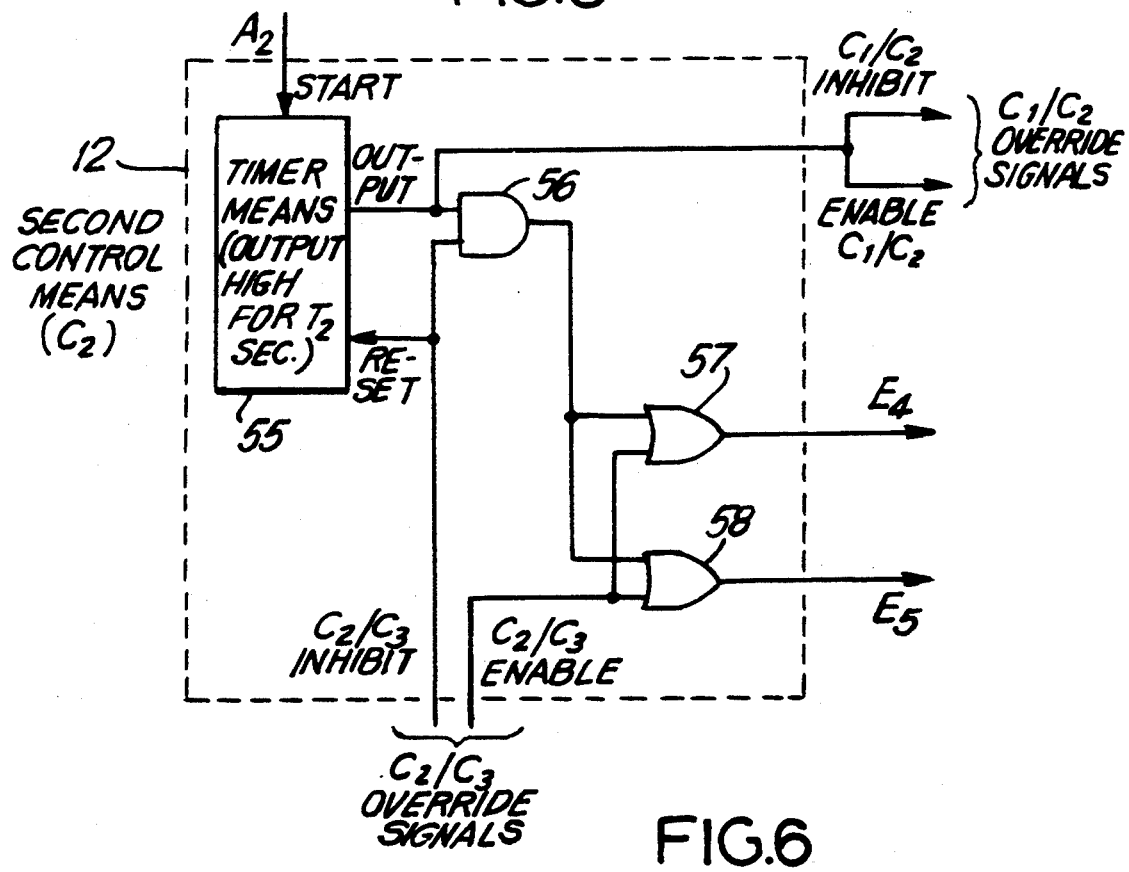
FIG. 6 is a logical function diagram of the second control means of the control system of the present invention.

As illustrated in FIG. 6, second control means 12 preferably includes a timing means 55 whose output signal remains high for a second predetermined time period $T_2$. Preferably, time period $T_2$ is selected to be about 1.0 seconds. Second control activation signal $A_2$ is provided to the start input of timing means 55, while the output thereof is provided as an input to AND gate 56, as shown. Third control means 13 provides a pair of $C_2$ override signals (i.e., $C_2/C_3$ A and $C_2/_3$B), as input to second control means 12, as shown in FIG. 2. The $C_2/C_3$ inhibit signal is provided to the second input of timing means 55. The $C_2/C_3$ enable signal, on the other hand, is provided to the first input of OR gates 57 and 58, whereas the output of AND gate 56 is provided as second input to each of OR gates 57 and 58. As illustrated in FIG. 6, the output signal of timing means provides both $C_1/C_2$ inhibit and $C_1/C_2$ enable signals, whereas the output of OR gates 57 and 58 provides enable signals $E_4$ and $E_5$ for enabling A/D conversion means 6 and symbol decoding means 7, respectively.

Upon detecting the presence of a bar code in the scan field, second control activation signal $A_2$ activates second control activation means 12, which, in turn, directly enables A/D conversion means 6 and symbol decoding means 7 by enabling signals $E_4$ and $E_5$, respectively. Indirectly, second control means 12 enables scanning means 3 and photoreceiving means 4 and disables bar code presence detection means 5 by providing $C_1$ override signals to first control means 11.

A/D conversion means 7 can be realized by any conventional A/D circuit or chip, and functions to convert analog scan data signal D into a digital scan data signal $D_2$, corresponding to the detected intensity of laser light collected and detected at photoreceiving means 4. The digitized scan data signal $D_2$ is provided as input to symbol decoding means 7, which scan line by scan line, decodes processes in a conventional manner, the stream of digitized scan data. The decoding means 7 processes a scan line of the digital scan data at a time, in an attempt to decode a valid bar code symbol within the second predetermined time period $T_2$ established and monitored by timing means 55 of second control means 12. If decoding means 7 successfully decodes a bar code symbol within time period $T_2$, symbol character data $D_3$ (typically in ASCII code format) is produced corresponding to the decoded bar code symbol. Thereupon third control activation signal $A_3$ is produced by symbol decoding means 7 and is provided to third control means 13 to activate the same. In response, third control means 13 provides override control signals to first control 11 and second control means 12, as described hereinabove.

As illustrated in FIGS. 2 and 7, third control means 13 of the illustrated embodiment generates and provides enable signals $E_6$, $E_7$ and $E_8$ to data format conversion means 8, data storage means 9 and data transmission means 10. As shown, symbol decoding means 7 provides symbol character data $D_3$ to data format means 8 to convert data $D_3$ into two differently formatted types of symbol character data, namely $D_4$ and $D_5$. Format-converted symbol character date $D_4$ is of the "packed data" format, particularly adapted for efficient storage in data storage means 9. Format-converted symbol character data $D_5$ is particularly adapted for data transmission to a host device 60, such as a computer, or electronic cash register. When symbol character data $D_4$ is to be converted into the format of the users choice based on a selected option mode, third control means 13 generates and provides enable signal $E_6$ to data storage means 9, as shown in FIG. 2. Similarly, when format converted data $D_5$ is to be transmitted to host device 60, the third control means 13 generates and provides enable signal $E_8$ to data transmission means 10, which thereupon transmits format-converted symbol character data $D_5$ to host device, via a conventional data transmission cable 61.

In the illustrated embodiment, third control means 13, symbol decoding means 7, and data format conversion means 8 and data storage means 9 are realized using a single programmable device, such as a microprocessor 63 having accessible memory and external timing means. In this way, conventional symbol decoding and data format conversion processing can be implemented in a straightforward manner. As for the programming microprocessor to realize third control means 13 and the control functions which it performs in the illustrated embodiment, reference is made to FIGS. 2, 5, 6, 7A and 7B in particular. In order to illustrate the nature of this programming and how it can be realized starting from a high level flow chart, System-Control Operation No. 2, illustrated in FIGS. 8A and 8B, will be used as an example.

Figure 7A:
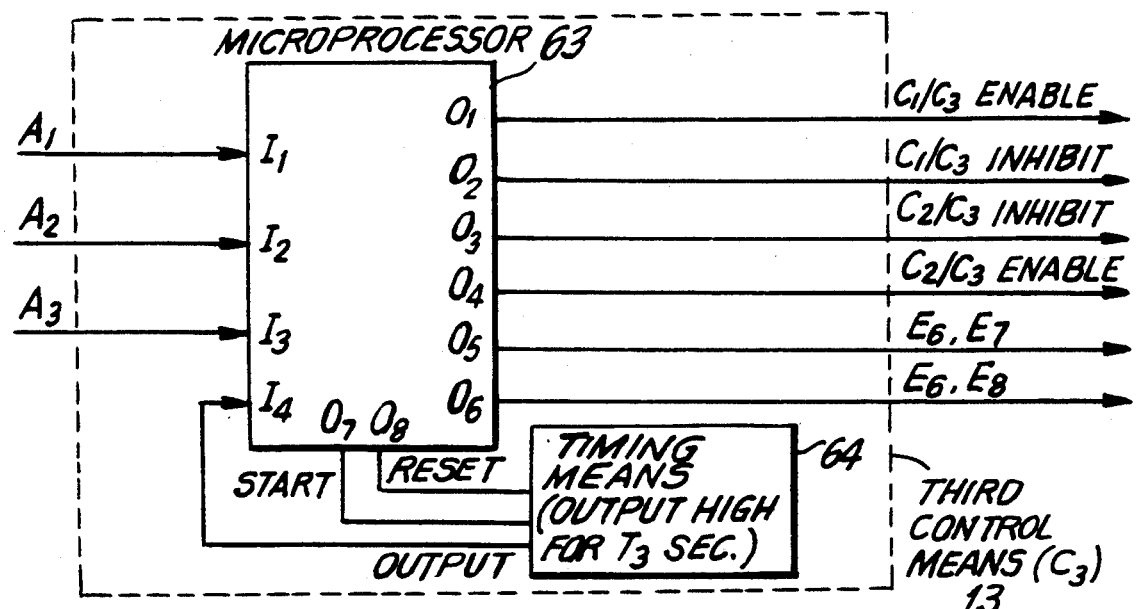
FIG. 7A is a functional block diagram of the third control means of the control system of the present invention.

In FIG. 7A, the third control means is shown implemented with a timer 64 and microprocessor 63, whose input pins $I_1$ through $I_4$ and output pins $O_1$ through $O_8$ are utilized in achieving the control functions performed during System-Control Operation No. 2. In order to illustrate the programmed operation of the third control means during System-Control Operation No. 2, reference is made to FIGS. 7A and 7B of the drawings.

In FIG. 7A, the output of timer 64 is provided to input pin $I_4$ of microprocessor 63, whereas outputs $O_7$ and $O_8$ thereof are provided as start and reset signals respectively, to timer 64 as shown. Timer 63 is selected to elapse at $T_3$, which preferably will be about 2-3 seconds. Notably, each input $I_1$ through $I_4$, output $O_1$ through $O_8$, control activation signals $A_1$ through $A_3$, and enable signal $E_1$ through $E_8$, may take on either a logical "high" value (i.e., 1), or a logical "low" value (i.e., 0). As illustrated in FIGS. 8A and 8B, during progression through System-Control Operation No. 2, the presence of third control activation signal $A_3$ (i.e., $A_3=1$) activates third control means 13. The presence of such signal value at the third control means indicates a valid bar code symbol has been decoded by symbol decoder 7. At the point of activation of third control means 13, the possible logical operations that may occur therewithin (illustrated in flow chart of FIG. 7B), are dependent upon the condition of the first and second control activation signals $A_1$ and $A_2$ and the input $I_4$ from the output of timer 64.

Figure 7B:
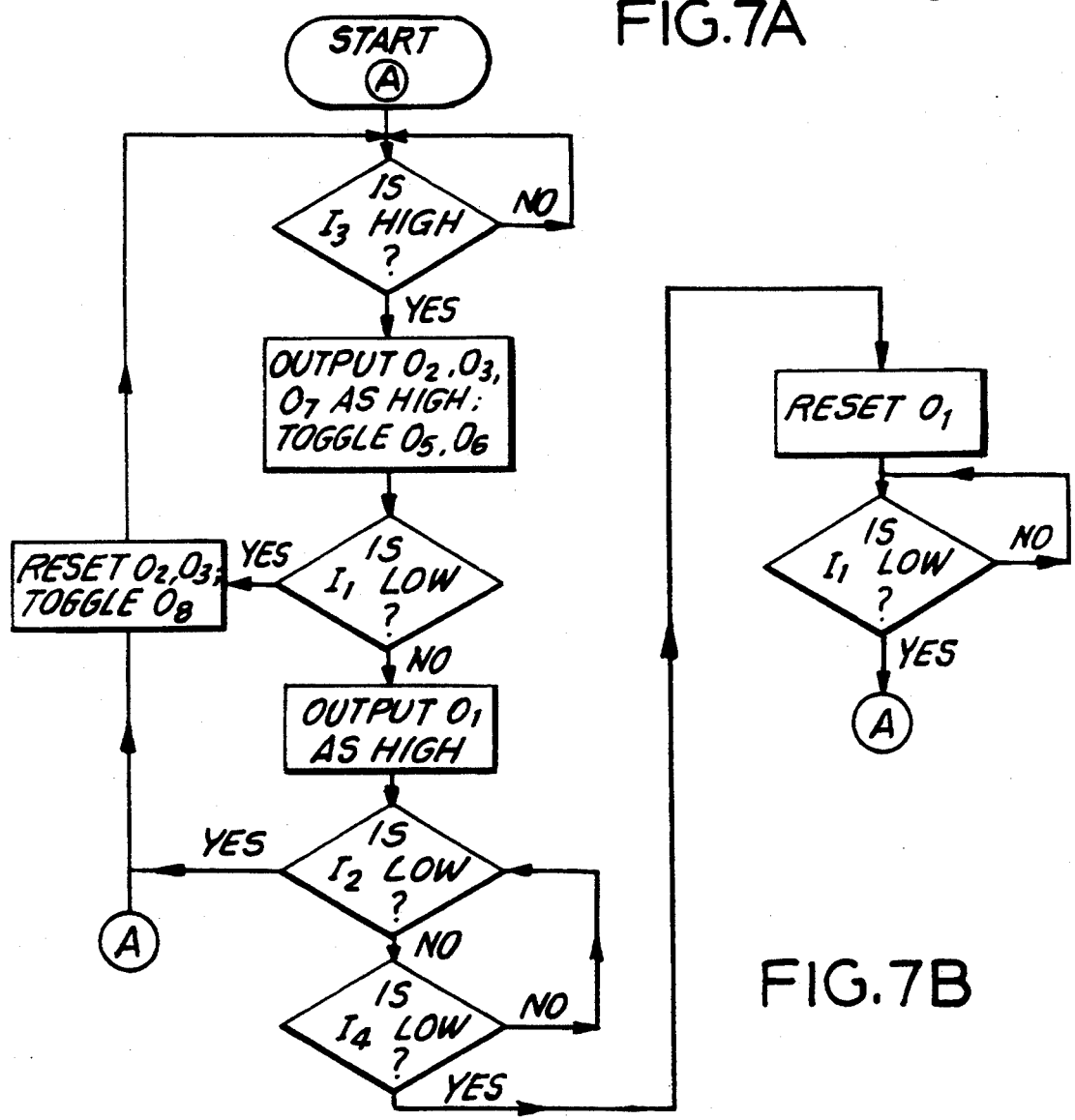
FIG. 7B is a flow chart of a control program carried out in the third control means for the case of system-control operation No. 2 (i.e., path option 2) of the illustrated embodiment.
Figure 8A:
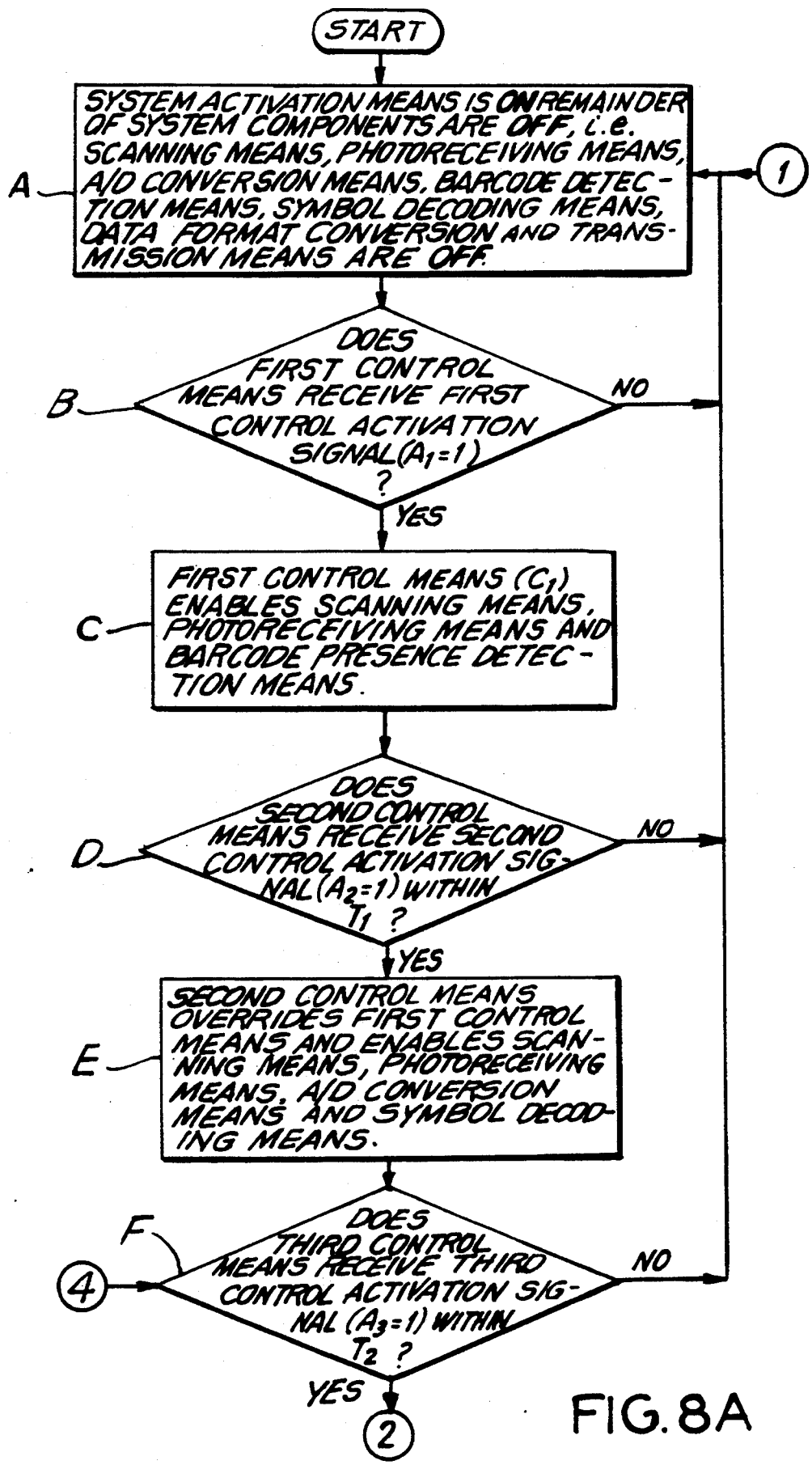
FIGS. 8A, 8B and 8C, taken together, show a high level flow chart illustrating three user-selectable courses of programmed system operation that the control system of the illustrated embodiment may undergo.
Figure 8B:
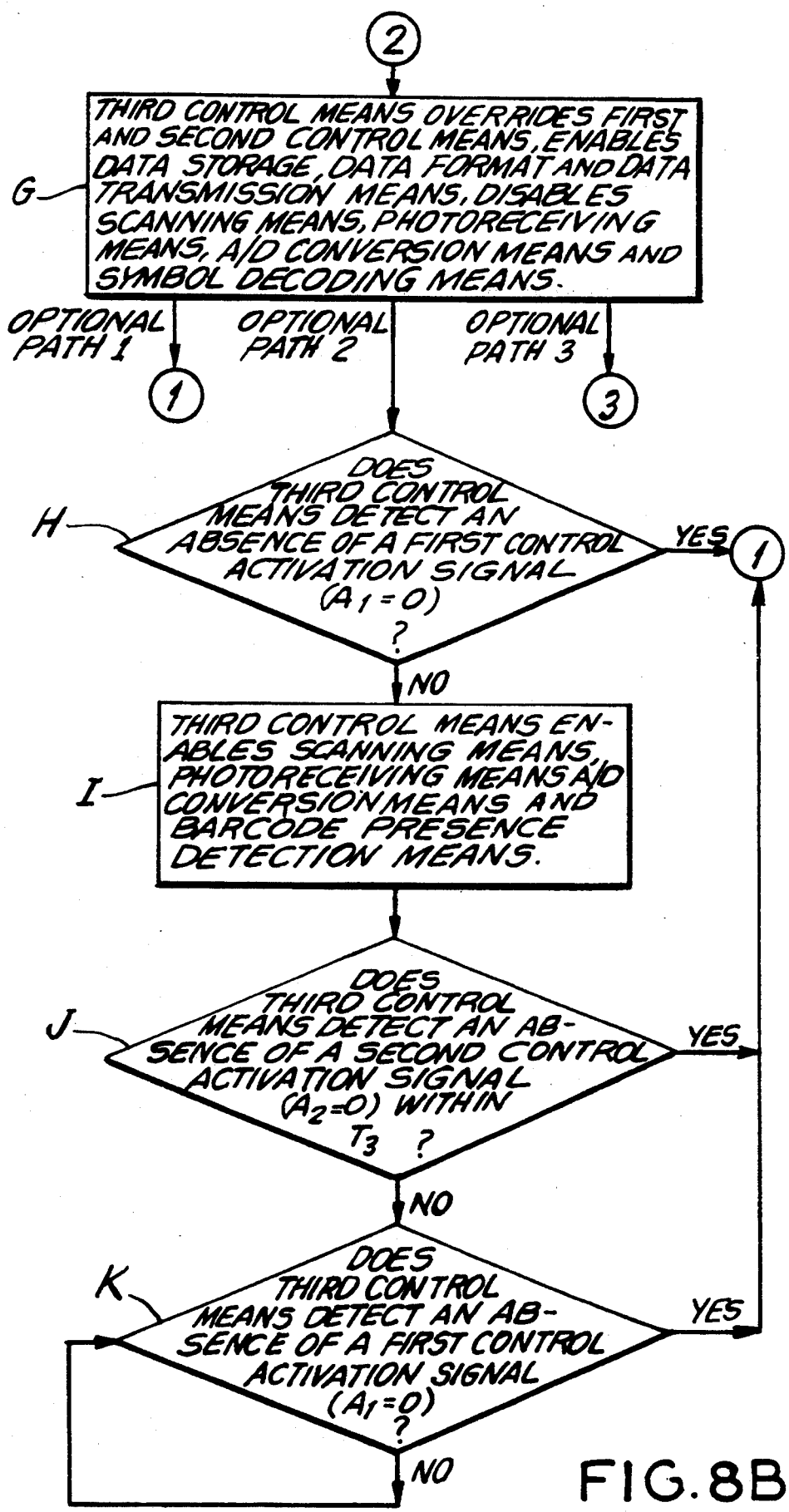

As illustrated in FIG. 7B, if control activation signals $A_3$ input at $I_3$ is "low" (i.e., $A_3=0$), then the control program of the third control means returns to "start" and once again continuously senses for the presence of third control activation signal (i.e., $A_3=1$). Otherwise, if third control activation signal $A_3$ input at $I_3$ is high (i.e., $A_3=1$), then the control program outputs $O_2$, $O_3$ and $O_7$ as high, inhibiting first and second control means 11 and 12, and starting timer ($T_3$) 64, while toggling outputs $O_5$ and $O_6$ to enable data format conversion means 8 and data storage means 9 or data transmission means 10.

Then, the control program proceeds to determine whether the first control activation signal $A_1$ at input $I_1$ is absent (i.e., $A_1=0$), indicative of no object in scan field; if so, then the control program resets outputs $O_2$ and $O_3$ to return control to the inhibited first and second control means, while toggling output $O_8$ to reset timer ($T_3$) 64. Otherwise, if input $I_1$ is high, indicative of an object in the scan field, then the control program outputs $O_1$ as high, enabling third control means 13 to override first control means 11, while enabling scanning means 3 photoreceiving means 4 and bar code presence detection means 5.

The control program then determines whether second control activation signal $A_2$ at input $I_2$ is low (i.e., $A_2=0$), indicative of no bar code present in the scan field; if so, the program resets outputs $O_2$ and $O_3$ to return control to the first and second control means, while toggling output $O_8$ to reset timer ($T_3$) 64. Otherwise, if second control activation signal $A_2$ at $I_2$ is high (i.e., $A_2=1$) indicative of a bar code present in the scan field, then the control program progresses to determine whether the output of timer 64 at input $I_4$ has gone low, indicative of timer elapse (i.e., $t \geq T_3$). In this event, the control program resets output $O_1$ to disable scanning means 3, photoreceiving means 4 and bar code detection means 5. If the input at $I_1$ is not low (i.e., $A_1=1$) indicative of timer 64 not yet elapsed, then the control program continues to determine whether the input at $I_2$ has gone low ($A_2=0$), indicative that a bar code symbol is no longer in the scan field. The control program will continue to repeat the above-described decision loop until either the bar code symbol disappears from the scan field or timer 64 elapses, whichever occurs first. If after timer 64 has elapsed and output $O_1$ has been reset, then the control program finally enters a last decision loop, to determine if first control activation signal $A_1$ at input $I_1$ has gone low, indicative that an object is no longer in the scan field. If it has, then the control program returns to start, as indicated in FIG. 7B. Otherwise, until input $I_1$ goes low, indicating that an object no longer remains in the scan field, the control program will continue to progress through this decision loop.

Figure 8C:
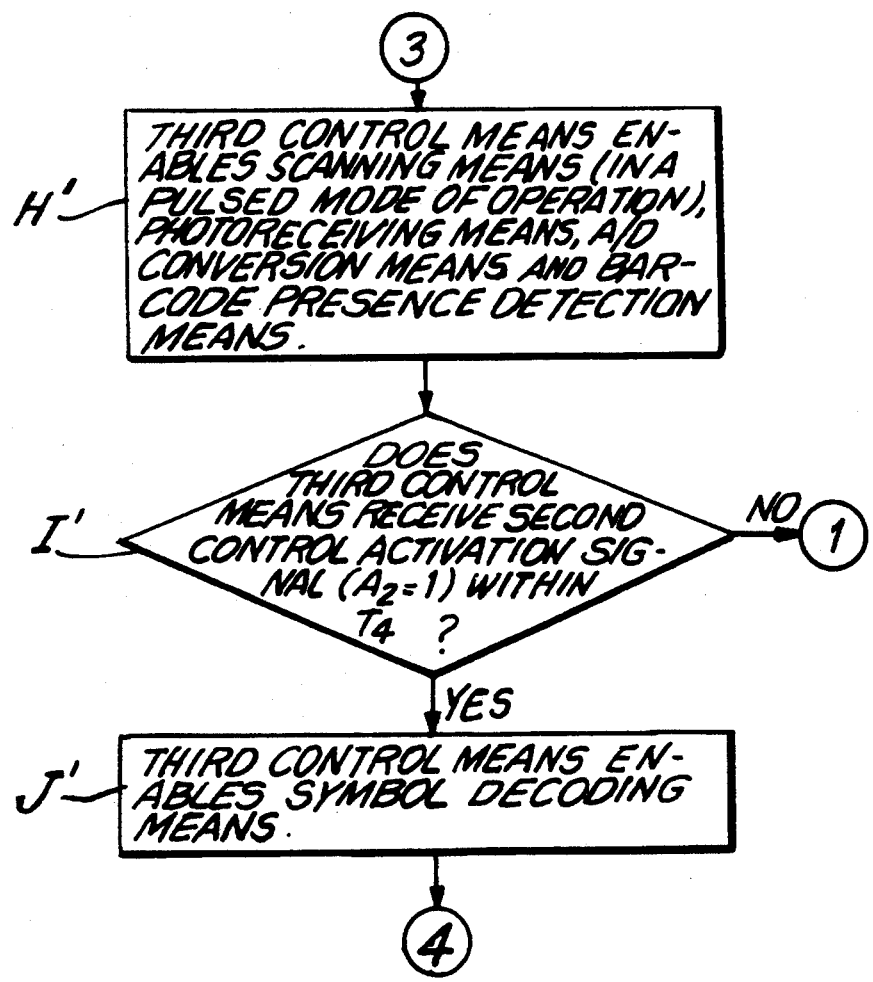

Notably, using the high level flow charts of FIGS. 8A and 8C, a control program for the third control means 13 can be implemented in a straightforward manner for System-Control Operation No. 3, illustrated in FIGS. 8B and 8C.

Having described the detailed structure and internal functions of bar code symbol reading device 1, it is now proper at this juncture to describe the operation of the control system hereof, for each of the three illustrated user-selectable System-Control Operations Nos. 1, 2 and 3.

Referring to blocks A to G in FIGS. 8A and 8B, Systems-Control Operation No. 1 is illustrated. Beginning at block A, hand-holdable device 1 is turned ON, which results in system activation means 2 being enabled (i.e., ON), while the remainder of the systems components (i.e., scanning means 3, photoreceiving means 4, A/D conversion means 6, bar code detection means 5, symbol decoding means 7, data format conversion means 8, data storage means 9 and data transmission means 10), being disabled (i.e., OFF). At block B, the control system then determines whether first control means 11 detects the presence of first control activation signal (i.e., $A_1=1$). If not, then the control system returns to block A; otherwise, if so, then as illustrated at block C, first control means 11 directly enables scanning means 3, photoreceiving means 4 and bar code presence detection means 5.

Then at block D, second control means 12 detects the presence of second control activation signal (i.e., $A_2=1$) within first predetermined time period $T_1$. If $A_2=1$ is not present, then the control system returns to block A; and if so, then as indicated at block E, second control means 12 overrides first control means 11 and indirectly enables scanning means 3, photoreceiving means 4, A/D conversion means 6, and symbol decoding means 7.

At block F, third control means 13 then detect the presence of third control activation signal (i.e., $A_3=1$) within second predetermined time period $T_2$. If $A_3=1$ is not present within $T_2$, then the control system returns to block A; and if so, then as indicated at block G, third control means 13 overrides first and second control means 11 and 12, and indirectly enables data format conversion means 8, and data storage means 9 or data transmission means 10 until these functions are achieved, and therewhile disables scanning means 3, photoreceiving means 4, A/D conversion means 6 and symbol decoding means 7. Thereafter, as shown in FIGS. 8A and 8B, the control system returns to block A, where only system activation means 2 is enabled.

Referring to blocks A through K in FIGS. 8A and 8B, System-Control (override) Operation No. 2 is illustrated. This system-control operation offers the advantage of being able to avoid multiple reading of bar code symbols due to the scanning beam dwelling on a bar code symbol for an extended period of time.

Essentially, System-Control Operation No. 2 comprises all but the last return operation of above-described System-Control Operation No. 1 and those additional operations represented by blocks G through K. After leaving block G, third control means 13 detects the absence of first control activation signal (i.e., $A_1=0$); and if absent, then the control system returns to block A. If first control activation signal $A_1$ is not absent but rather present (i.e., $A_1=1$), then third control means 13 indirectly enables through overridden first control means 11, scanning means 3 and the photoreceiving means 4, and through overridden second control means 12 indirectly enables A/D conversion means 6 and bar code presence detection means 5. Thereafter, at block J, third control means 13 detects the absence of second control activation signal (i.e., $A_2=0$) within predetermined time period $T_3$. If signal $A_2$ is absent, then the control system returns to block A; and if signal $A_2$ is present (i.e., $A_2=1$), then third control means 13 enters a decision loop at block K. Here, third control means 13 in override mode continually detects the absence of the first activation signal (i.e., $A_1=0$), at which time the control system returns to block A.

Referring to blocks A through G and H' through J' in FIGS. 8A, 8B and 8C, System-Control Operation No. 3 is illustrated. This system-control operation offers the advantage of being able to simply read bar code symbols in inventory applications, while conserving battery power.

Essentially, System-Control Operation No. 3 comprises all but the last return operation of above-described System-Control Operation No. 1 and those additional operations represented by blocks H' through J'. After leaving block G, third control means 13 enables, through overridden first control means 11, scanning means 3 in a pulsed mode of operation (by providing a pulsed enable signal $E_1'$ to laser driver 37) At block H', third control means 13 also enables through overridden first control means 11, photoreceiving means 3, and through overridden second control means 12, enables bar code presence detection means 5, and A/D conversion means 6.

Thereafter at block I', third control means 13 detects the presence of second control activation means (i.e., $A_2=1$) within a fourth predetermined time period $T_4$, determined using an internal timer similar to timer ($T_3$) 64 in FIG. 7A. Preferrably, the time duration of $T_3$ is selected to be about 5–10 seconds. If signal $A_2$ is not present but rather absent (i.e., $A_2=0$), then the control system returns to block A. Otherwise, if signal $A_2$ is present, then third control means 13 enables, through overridden second control means 12, symbol decoding means 7. Thereafter, the control system returns to block F, shown in FIG. 8A.

Having described the operation of the control system of the bar code symbol reading device of present invention, it can also be helpful to understand the various states that device 1 may be in during the course of each particular system-control operation described above. In this regard, reference is made to FIG. 9 which provides a state diagram for the three system-control operations of the illustrated embodiment.

Figure 9:
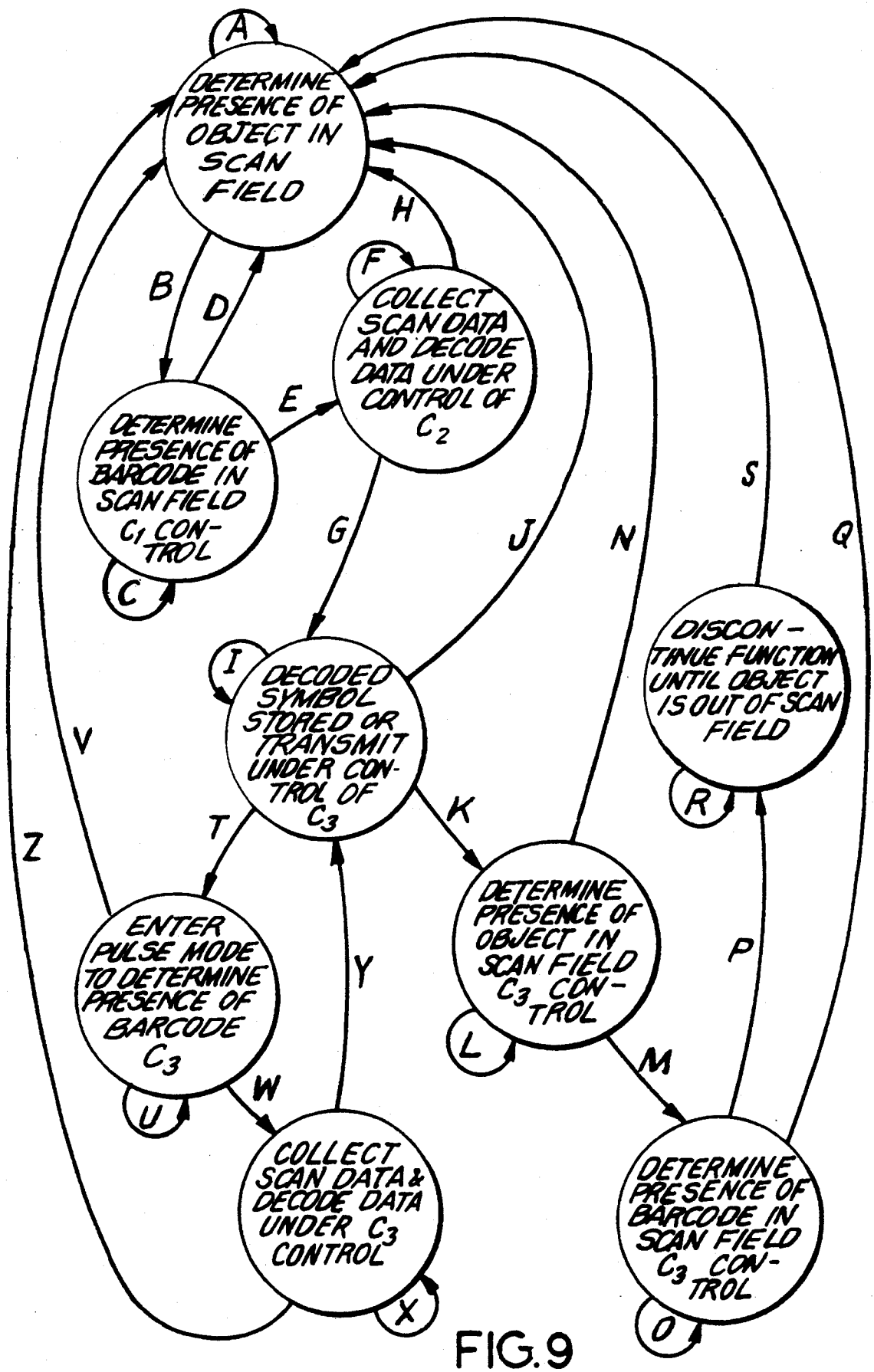
FIG. 9 is a state diagram illustrating the various states that the bar code symbol reading device of the illustrated embodiment may undergo during the course of its operation.

System-Control Operation No. 1 selected at option path 1, will be considered first. As illustrated in FIG. 9, when bar code symbol reading device is turned ON, only system activation means 2 is operative and all other system components are inoperative. This condition is indicated by state A, in which the device seeks to determine whether an object is in the scan field. Upon determination of the presence of an object in the scan field, the device will undergo state transition B, placing the device in state C.

In state C, the device seeks to determine within line $T_1$ the presence of a bar code in scan field, while under the control of first control means 11. If no bar code symbol is determined to present in the scan field with time period $T_1$ then the device will undergo state transition D, returning the device back to initial state A (indicated as "start" in FIG. 8A). On the other hand, if a bar code symbol is determined to be present in the scan field within time period $T_1$, then the device will undergo state transition E, placing the device in state F.

In state F, the device collects bar code scan data $D_1$ under the control of second control means 12, converts scan data $D_1$ into scan data $D_2$ and decode processes this scan data, scan-line by scan-line, in an attempt to decode a valid bar code symbol within time period $T_2$. If a bar code symbol is not decoded within time period $T_2$, then the device undergoes state transition H, returning the device to initial state A. If on the other hand a valid bar code symbol is decoded within time period $T_2$, symbol character data $D_3$ produced, and then the device undergoes state transition G, placing the device on "control-override" state I.

In state I, device 1 while under control of the third control means, converts the data format of symbol character data $D_3$ into either data $D_4$ or $D_5$ depending on whether the converted symbol character data is to be stored or transmitted to host device 60. Also in state I, the device either stores data $D_5$ in storage means 9, or transmits data $D_5$ to host device 60 via data transmission means 10 and data transmission cable 61, shown in FIG. 2. After completion of the above functions, the device undergoes state transition J (due to user-selection of System-Control Operation No. 1), returning the device to initial state A, completing a full path through System-Control Operation No. 1.

System-Control Operation No. 2, selected at option path 2, will now be considered. From control override state I, the device undergoes transition K, due to user-selection of System-Control Operation No. 2, placing the device in control-override state L. In state L, the device determines the presence of an object in the scan field, while under the override control of third control means 13. Upon determination of the presence of an object in the scan field device 1 undergoes state transition M, placing it into state O. On the other hand, if no object is determined to be within the scan field, then the device returns to initial state A.

In state O, the device seeks to determine the presence of a bar code symbol within the scan field, while the device is under the control of third control means 13. If the device determines that no bar code symbol is within the scan field, then the device undergoes state transition Q, returning the device to initial state A. If on the other hand the device determines that a bar code symbol lies within the scan field, indicative of the scanning beam dwelling on a bar code symbol for an extended period of time, then the device undergoes state transition P, placing device 1 in control-override state R.

In state R, the device discontinues scanning, photoreceiving and bar code presence detection functions under the control of third control means 13, and continues to sense the presence of the object in the scan field until the object is removed therefrom. When the presence of the object is no longer detected within the scan field, then the device undergoes state transition S, returning the device to initial state A.

Lastly, System-Control Operation No. 3, selected at option path 3, is now considered. From control-override state I, the device undergoes state transition T, due to user-selection of System-Control Operation No. 3, placing the device in control-override state U. In state U, scanning means 3 is enabled in a pulsed-mode of operation under control of third control 13, photoreceiving means 4 and bar code presence detection means 5 are also enabled under third control means 13, and therewhile the device seeks to detect the presence of a bar code symbol in the scan field within fourth predetermined time period $T_4$. If a bar code symbol is not detected within time period $T_4$, then the device undergoes state transition V and returns to initial state A under override control of third control means 13. If on the other hand, the presence of a bar code symbol is detected within time period $T_4$, then the device undergoes state transition W, placing the device in control-override state X.

In state X, bar code scan data is collected scan-line by scan-line, and each scan line of data is decode processed in order to decode a valid bar code symbol. If a bar code symbol is decoded within time period $T_2$, then symbol character data $D_3$ is produced and the device undergoes state transition Y, placing device in control-override state I under the control of third control means 13. There, symbol character data $D_3$ is format converted, and stored or transmitted as hereinbefore described. Thereafter, device 1 returns to state U under control of the third control means. If, however, a bar code symbol is not decoded within time period $T_2$, then the device undergoes state transition Z, returning the device to state A while under the control of third contact means 13.

Figure 10:
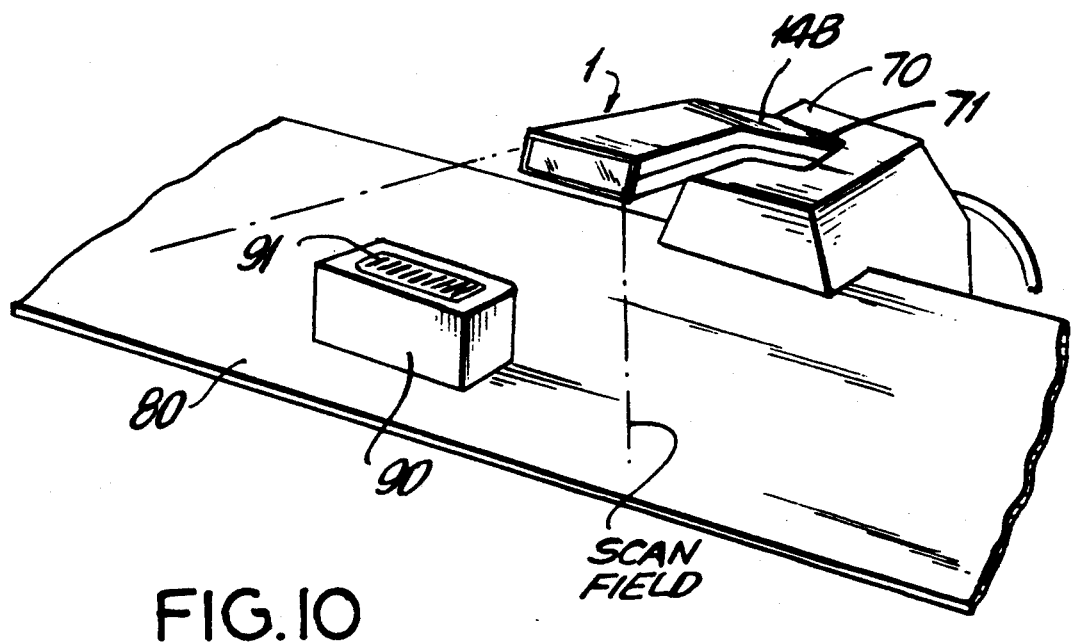
FIG. 10 is a perspective view of a surface-mountable support stand adapted for receipt of the hand-held bar code symbol reading device of the present invention and facilitating table top use thereof.

The automatic hand-holdable bar code symbol reading device of the present invention may also be used as stationary bar code symbol reader, as shown in FIG. 10. There, a support stand 70 is shown having a receptacle 71 for receipt of housing handle portion 14B using support stand 70, device 1 can be mounted so as to position the scan field over a counter top 80 where goods 90 bearing bar codes 91 may be passed for reading.

While device 1 of the present invention has been provided with three user-selectable system-control (i.e., intelligence) operations, additional system-control operations may be provided to the control system hereof, in a manner as discussed hereinabove.

While the particular embodiment shown and described above has proven to be useful in many application in the code symbol reading art, further modification of the present invention herein disclosed will occur to persons skilled in the art to which the present invention pertains, and all such modifications are deemed to be within the scope and spirit of the present invention defined by the appended claims.

What is claimed is:

1. An automatic bar code symbol reading system, comprising:
    a hand-supportable housing having a light transmission aperture through which visible light can exit and enter said hand-supportable housing;
    an object detection circuit in said hand-supportable housing, for detection of an object located within at least a portion of a scan field defined external to said hand-supportable housing, and automatically generating a first activation signal in response to the detection of said object in at least a portion of said scan field;
    scan data producing means in said hand-supportable housing, for producing, when activated, scan data from said detected object located in said scan field, said scan data producing means including
    a laser beam producing means disposed in said hand-supportable housing for producing and projecting a visible laser beam through said light transmission aperture, and repeatedly scanning said visible laser beam across said scan field and a bar code symbol on said detected object, and
    laser light detecting means for detecting the intensity of laser light reflected off said bar code symbol, and for automatically producing scan data indicative of said detected intensity;
    bar code symbol detection circuit for processing produced scan data, when activated, so as to detect said bar code symbol on said detected object, and automatically generating a second activation signal in response to the detection of said bar code symbol;
    a programmed microprocessor operably associated with said bar code symbol detection circuit, for processing produced scan data, when activated so as to decode said detected bar code symbol, and automatically produce symbol character data representative of said decoded bar code symbol in response to the decoding of said detected bar code symbol; and
    system control means for controlling the operation of said automatic bar code symbol reading system, said system control means including
    first control means for automatically activating said scan data producing means and said bar code symbol detection circuit for up to a first predetermined time period in response to the generation of said first activation signal, and
    second control means for automatically activating said scan data producing means and said programmed microprocessor for up to a second predetermined time period in response to the generation of said second activation signal.

2. The automatic bar code symbol reading system of claim 1,
    wherein said first control means further comprises means for automatically deactivating said scan data producing means and said bar code symbol detection circuit in response to said bar code symbol detection circuit failing to generate said second activation signal within said first predetermined time period, and
    wherein said second control means further comprises means for automatically deactivating said scan data producing means and said programmed microprocessor in response to said programmed microprocessor failing to produce said symbol character data within said second predetermined time period.

3. The automatic bar code symbol reading system of claim 1, wherein said first control means and said second control means comprise first and second electronic circuits, respectively.

4. The automatic bar code symbol reading system of claim 1, wherein said bar code symbol has first and second envelope borders;
    wherein said bar code symbol detection circuit comprises means for detecting said first and second envelope borders.

5. The automatic bar code symbol reading system of claim 1, wherein said first control means and said second control means comprise first and second control circuits, respectively.

6. The automatic bar code symbol reading system of claim 1, wherein said bar code symbol detection circuit comprises a bar code symbol envelope detection circuit.

7. The automatic bar code symbol reading system of claim 1, wherein said laser beam source comprises a laser diode.

8. The automatic bar code symbol reading system of claim 1, wherein said object detection circuit comprises signal transmitting means for transmitting a signal into said scan field, and signal receiving means for receiving said transmitted signal reflected off said object in at least a portion of said scan field, and automatically generating said first activation signal to indicate the detection of said object in at least a portion of said scan field.

9. The automatic bar code symbol reading system of claim 8,
wherein said signal transmitting means comprises an infra-red light source for transmitting a pulsed infra-red light signal from said hand-supportable housing, and
wherein said signal receiving means comprises a means for focusing reflected infra-red light pulses onto an infra-red light detector disposed in said hand-supportable housing.

10. The automatic bar code symbol reading system of claim 1, wherein said hand-supportable housing comprises a head portion and a handle portion.

11. The automatic bar code symbol reading system of claim 10, wherein said object detection circuit and said scan data producing means are disposed in said head portion.

12. An automatic bar code symbol reading system, comprising:
a hand-supportable housing having a light transmission aperture through which visible light can exit and enter said hand-supportable housing;
an object detection circuit in said hand-supportable housing, for detection of an object located within at least a portion of a scan field defined external to said hand-supportable housing, and automatically generating a first activation signal in response to the detection of said object in at least a portion of said scan field;
scan data producing means in said hand-supportable housing, for producing, when activated, scan data from said detected object located in said scan field, said scan data producing means including
a laser beam producing means disposed in said hand-supportable housing for producing and projecting a visible laser beam through said light transmission aperture, and repeatedly scanning said visible laser beam across said scan field and a bar code symbol on said detected object, and
laser light detecting means for detecting the intensity of laser light reflected off said bar code symbol, and for automatically producing scan data indicative of said detected intensity;
a bar code symbol detection circuit for processing produced scan data, when activated, so as to detect said bar code symbol on said detected object, and automatically generate a second activation signal in response to the detection of said bar code symbol;
a programmed microprocessor for processing produced scan data, when activated, so as to decode said detected bar code symbol, and automatically producing symbol character data representative of said decoded bar code symbol in response to the decoding of said detected bar code symbol; and
system control means for automatically activating said scan data producing means and said bar code symbol detection circuit for up to a first predetermined time period in response to the generation of said first activation signal, and automatically activating said scan data producing means and said programmed microprocessor for up to a second predetermined time period in response to the generation of said second activation signal.

13. The portable automatic bar code symbol reading system of claim 12,
wherein said system control means further comprises means for automatically deactivating said scan data producing means and said bar code symbol detection circuit in response to said bar code symbol detection circuit failing to generate said second activation signal within said first predetermined time period, and
wherein said system control means further comprises means for automatically deactivating said scan data producing means and said programmed microprocessor in response to said programmed microprocessor failing to produce said symbol character data within said second predetermined time period.

14. The automatic bar code symbol reading system of claim 12,
wherein said bar code symbol has first and second envelope borders, and said bar code symbol detection circuit detects said bar code symbol by detecting said first and second envelope borders.

15. The automatic bar code symbol reading system of claim 12, wherein said object detection circuit comprises
signal transmitting means for transmitting a signal into said scan field, and
signal receiving means for receiving said transmitted signal reflected off said object in at least a portion of said scan field, and automatically generating said first activation signal indicative of the detection of said object in at least a portion of said scan field.

16. The automatic bar code symbol reading system of claim 12, wherein said signal transmitting means comprises an infra-red light source for transmitting a pulsed infra-red light signal, and wherein said signal receiving means comprises an optical element for focusing reflected infra-red light pulses onto an infra-red light detector disposed in said hand-supportable housing.

17. The automatic bar code symbol reading system of claim 12, wherein said laser producing means comprises a laser diode.

18. The automatic bar code symbol reading system of claim 12, wherein said hand-supportable housing comprises a head portion and a handle portion.

19. The automatic bar code symbol reading system of claim 18, wherein said object detection circuit and said scan data producing means are disposed in said head portion.

20. A automatic bar code symbol reading system, comprising:
a hand-supportable housing having a light transmission aperture through which visible light can exit and enter said hand-supportable housing;
an object detection circuit in said hand-supportable housing, for detection of an object located within at least a portion of a scan field defined external to said hand-supportable housing and automatically generating a first activation signal in response to the detection of said object in at least a portion of said scan field;
scan data producing means in said hand-supportable housing, for producing scan data from said detected object located in said scan field, said scan data producing means including
a laser beam producing means disposed in said hand-supportable housing for producing and projecting a laser beam through said light transmission aperture, and repeatedly scanning said laser beam across said scan field and a bar code symbol on said detected object, and laser light detecting means for detecting the intensity of laser light reflected off said bar code symbol, and for automatically producing scan data indicative of said detected intensity;

a bar code symbol detection circuit for processing produced scan data, when activated, so as to detect said bar code symbol on said detected object, and automatically generate a second activation signal in response to the detection of said bar code symbol;

a programmed microprocessor for processing produced scan data, when activated, so as to decode said detected bar code symbol, and automatically producing symbol character data representative of said decoded bar code symbol in response to the decoding of said detected bar code symbol; and system control circuitry for automatically activating said bar code symbol detection circuit in response to the generation of said first activation signal, and automatically activating said programmed microprocessor in response to the generation of said second activation signal.

21. The automatic bar code symbol reading system of claim 20, wherein said system control circuitry further comprises means for automatically deactivating said bar code symbol detection circuit in response to said bar code symbol detection circuit failing to generate said second activation signal within a first predetermined time period, and wherein said system control circuitry further comprises means for automatically deactivating said programmed microprocessor in response to said programmed microprocessor failing to produce said symbol character data within a second predetermined time period.

22. The automatic bar code symbol reading system of claim 21, wherein said object detection circuit comprises signal transmitting means for transmitting a signal into said scan field, and signal receiving means for receiving said transmitted signal reflected off said object in at least a portion of said scan field, and automatically generating said activation signal indicative of the detection of said object in at least a portion of said scan field.

23. The automatic bar code symbol reading system of claim 20, wherein said bar code symbol has first and second envelope borders, and said bar code symbol detection circuit detects said bar code symbol by detecting said first and second envelope borders.

24. The automatic bar code symbol reading system of claim 20, wherein said signal transmitting means comprises an infra-red light source for transmitting a pulsed infra-red light signal, and wherein said signal receiving means comprises an optical element for focusing reflected infra-red light pulses onto an infra-red light detector disposed in said hand-supportable housing.

25. The automatic bar code symbol reading system of claim 20, wherein said laser beam producing means comprises a laser diode.

26. The automatic bar code symbol reading system of claim 20, wherein said hand-supportable housing comprises a head portion and handle portion.

27. The automatic bar code symbol reading system of claim 26, wherein said object detection circuit and said scan data processing means are disposed in said head portion.

28. An automatic bar code symbol reading system, comprising:

a compact housing having a light transmission aperture through which visible light can exit and enter said compact housing;

an object detection circuit in said compact housing, for detection of an object located within at least a portion of a scan field defined external to said hand-supportable housing and automatically generating a first activation signal in response to the detection of said object in at least a portion of said scan field;

scan data producing means in said compact housing, for producing scan data from said detected object located in said scan field, said scan data producing means including a laser beam producing means disposed in said compact housing for producing and projecting a laser beam through said light transmission aperture, and repeatedly scanning said laser beam across said scan field and a bar code symbol on said detected object, and laser light detecting means for detecting the intensity of laser light reflected off said bar code symbol, and for automatically producing scan data indicative of said detected intensity;

a bar code symbol detection circuit for processing produced scan data in response to the generation of said first activation signal, so as to detect said bar code symbol on said detected object, and automatically generate a second activation signal in response to the detection of said bar code symbol;

a programmed microprocessor operably associated with said bar code symbol detection circuit, for processing produced scan data, when activated, so as to decode said detected bar code symbol, and automatically producing symbol character data representative of said decoded bar code symbol; and system control circuitry for automatically activating said programmed microprocessor in response to the generation of said second activation signal and automatically deactivating said programmed microprocessor in response to said programmed microprocessor failing to produce symbol character data within a predetermined time period.

29. The automatic bar code symbol reading system of claim 28, wherein said bar code symbol has first and second envelope borders, and said bar code symbol detection circuit detects said bar code symbol by detecting said first and second envelope borders.

30. The automatic bar code symbol reading system of claim 28, wherein said object detection circuit comprises signal transmitting means for transmitting a signal into said scan field, and signal receiving means for receiving said transmitted signal reflected off said object in at least a portion of said scan field, and automatically generating said first activation signal in response to receiving said transmitted signal.

31. The automatic bar code symbol reading system of claim 30, wherein said signal transmitting means comprises an infra-red light source for transmitting a pulsed infra-red light signal, and wherein said signal receiving means comprises an optical element for focusing reflected infra-red light pulses onto an infra-red light detector disposed in said hand-supportable housing.

32. The automatic bar code symbol reading system of claim 28, wherein said laser beam producing means comprises a laser diode.

33. The automatic bar code symbol reading system of claim 28, wherein said compact housing is a hand-supportable housing.

34. The automatic bar code symbol reading system of claim 33, wherein said hand-supportable housing comprises a head portion and a handle portion.

35. The automatic bar code symbol reading system of claim 34, wherein said object detection circuit and said scan data processing means are disposed in said head portion.

36. The automatic bar code symbol reading system of claim 34, wherein said object detection circuit, said bar code symbol detection circuit, said programmed microprocessor, and said system control circuitry are disposed in said hand-supportable housing.

37. A method of reading bar code symbols using a portable automatic bar code symbol reading system having a hand-supportable housing, comprising the steps:
  (a) supporting said hand-supportable housing adjacent an object bearing a bar code symbol so that said object is located within at least a portion of a scan field defined external to said hand-supportable housing and said hand-supportable housing is disposed in a non-contacting relationship with said object, said automatic bar code symbol reading system further including
    (1) a light transmission aperture in said hand-supportable housing, through which visible light can exit and enter said hand-supportable housing,
    (2) an object detection circuit in said hand-supportable housing, for automatically detecting said object located within at least a portion of said scan field, and producing a first activation signal in response to the detection of said object,
    (3) scan data producing means in said hand-supportable housing, for producing scan data from said detected object located in said scan field, said scan data producing means including
      (i) a laser beam producing means for producing and projecting a laser beam through said light transmission aperture, and repeatedly scanning said laser beam across said scan field and a bar code symbol on said detected object, and
      (ii) laser light detecting means for detecting the intensity of laser light reflected off said bar code symbol, and for automatically producing scan data indicative of said detected intensity,
    (4) a bar code symbol detection circuit for processing, when activated, produced scan data in response to the generation of said first activation signal, and detecting said bar code symbol on said detected object, and automatically generating a second activation signal in response to the detection of said bar code symbol,
    (5) a programmed microprocessor operably associated with said bar code symbol detection circuit, for processing produced scan data, when activated, so as to decode said detected bar code symbol, and automatically produce symbol character data representative of said decoded bar code symbol in response to the decoding of said detected bar code symbol, and
    (6) system control circuitry for automatically activating said programmed microprocessor in response to the generation of said second activation signal and automatically deactivating said programmed microprocessor in response to said programmed microprocessor failing to produce said symbol character data within a predetermined time period;
  (b) detecting said object in said scan field, and automatically generating said first activation signal in response to the detection of said object;
  (c) producing and projecting a visible laser beam through said light transmission aperture and repeatedly scanning said visible laser beam across said scan field and said bar code symbol on said detected object;
  (d) automatically detecting at said laser light detecting means, the intensity of laser light reflected off said bar code symbol as said visible light beam is scanned across said bar code symbol, and automatically producing a first electrical signal responsive to the detected intensity of said reflected laser light;
  (e) automatically processing said first electrical signal using said bar code symbol detection circuit in order to detect said bar code symbol on said detected object, and upon detecting said bar code symbol on said detected object, automatically generating a second activation signal;
  (f) in response to the generation of said second activation signal, automatically continuing the production and repeatedly scanning of said visible laser beam across said scan field and said detected bar code symbol, and activating said programmed microprocessor for decode processing;
  (g) automatically detecting at said laser light detecting means, the intensity of laser light reflected off said detected bar code symbol, and producing a second electrical signal responsive to the detected intensity of said reflected laser light; and
  (h) automatically processing said second electrical signal using said programmed microprocessor in order to decode said detected bar code symbol on said detected object, and upon decoding said detected bar code symbol, automatically producing symbol character data representative of said decoded bar code symbol, and upon failing to decode said detected bar code symbol within a predetermined time period, automatically deactivating said programmed microprocessor.

38. The method of claim 37, where step (a) further comprises
  containing said object detection circuit, said scan data producing means, said bar code symbol detection circuit, said programmed microprocessor, and said system control circuitry in said hand-supportable housing.

39. The method of claim 38, wherein step (a) further comprises
  supporting said hand-supportable housing by way of a handle portion.

40. A portable bar code symbol reading system, comprising:
  a hand-supportable housing having a light transmission aperture through which light can exit said hand-supportable housing;

activation signal generating means in said hand-supportable housing, for generating a first activation signal indicative of the presence of an object located within at least a portion of a scan field defined external to said hand-supportable housing;

scan data producing means in said hand-supportable housing, for producing scan data from said detected object located in said scan field, said scan data producing means including a laser beam producing means disposed in said hand-supportable housing for producing and projecting a laser beam through said light transmission aperture, and repeatedly scanning said laser beam across said scan field and a bar code symbol on said object, and laser light detecting means for detecting the intensity of laser light reflected off said bar code symbol, and for automatically producing scan data indicative of said detected intensity;

a bar code symbol detection circuit for processing produced scan data in response to the generation of said first activation signal, so as to detect said bar code symbol on said detected object, and automatically generate a second activation signal in response to the detection of said bar code symbol;

a programmed microprocessor operably associated with said bar code symbol detection circuit, for processing produced scan data, when activated, so as to decode said detected bar code symbol, and automatically producing symbol character data representative of said decoded bar code symbol; and system control circuitry for automatically activating said programmed microprocessor in response to the generation of said second activation signal and automatically deactivating said programmed microprocessor in response to said programmed microprocessor failing to produce symbol character data within a predetermined time period.

41. The portable bar code symbol reading system of claim 40,
wherein said bar code symbol has first and second envelope borders, and said bar code symbol detection circuit detects said bar code symbol by detecting said first and second envelope borders.

42. The portable bar code symbol reading system of claim 40, wherein said activation signal generation means further comprises
signal transmitting means for transmitting a signal into said scan field, and
signal receiving means for receiving said transmitted signal reflected off said object in at least a portion of said scan field, and automatically generating said first activation signal in response to receiving said transmitted signal.

43. The portable bar code symbol reading system of claim 40, wherein said laser beam producing means comprises a laser diode.

44. The portable bar code symbol reading system of claim 43, wherein said hand-supportable housing comprises a head portion and a handle portion.

45. The portable bar code symbol reading system of claim 44, wherein said activation signal generation means and said scan data processing means are disposed in said head portion.

46. An automatic bar code symbol reading system of claim 40, wherein said activation signal generation means comprising an object detection circuit disposed in said hand-supportable housing.

47. The portable bar code symbol reading system of claim 40, wherein said activation signal generation means, said bar code symbol detection circuit, said programmed microprocessor, and said system control circuitry are disposed in said hand-supportable housing.

48. A method of reading bar code symbols using a portable automatic bar code symbol reading system having a hand-supportable housing, comprising the steps:

(a) supporting said hand-supportable housing adjacent an object bearing a bar code symbol so that said object is located within at least a portion of a scan field defined external to said hand-supportable housing and said hand-supportable housing is disposed in a non-contacting relationship with said object, said automatic bar code symbol reading system further including (1) a light transmission aperture in said hand-supportable housing, through which light can exit said hand-supportable housing, (2) activation signal generation means in said hand-supportable housing, for producing a first activation signal indicative of the presence of said object in at least a portion of said scan field, and, (3) scan data producing means in said hand-supportable housing, for producing scan data from said detected object located in said scan field, said scan data producing means including (i) light producing means for producing and projecting light through said light transmission aperture, across said scan field and onto a bar code symbol on said object, and (ii) light detecting means for detecting the intensity of light reflected off said bar code symbol, and for automatically producing scan data indicative of said detected intensity, (4) a bar code symbol detection circuit for processing, when activated, produced scan data in response to the generation of said first activation signal, and detecting said bar code symbol on said detected object, and automatically generating a second activation signal in response to the detection of said bar code symbol, (5) a programmed microprocessor operably associated with said bar code symbol detection circuit, for processing produced scan data, when activated, so as to decode said detected bar code symbol, and automatically produce symbol character data representative of said decoded bar code symbol in response to the decoding of said detected bar code symbol, and (6) system control circuitry for automatically activating said programmed microprocessor in response to the generation of said second activation signal and automatically deactivating said programmed microprocessor in response to said programmed microprocessor failing to produce said symbol character data within a predetermined time period;

(b) indicating the presence of said object in at least a portion of scan field by generating said first activation signal;

(c) producing and projecting light through said light transmission aperture, across said scan field and onto said bar code symbol on said object;

(d) automatically detecting at said light detecting means, the intensity of light reflected off said bar code symbol as said light projected onto said bar code symbol, and automatically producing a first electrical signal responsive to the detected intensity of said reflected laser light;

(e) automatically processing said first electrical signal using said bar code symbol detection circuit in order to detect said bar code symbol on said detected object, and upon detecting said bar code symbol on said detected object, automatically generating a second activation signal;

(f) in response to the generation of said second activation signal, automatically continuing the production and projecting of said light across said scan field and onto said detected bar code symbol, and activating said programmed microprocessor for decode processing;

(g) automatically detecting at said light detecting means, the intensity of light reflected off said detected bar code symbol, and producing a second electrical signal responsive to the detected intensity of said reflected light; and (h) automatically processing said second electrical signal using said programmed microprocessor in order to decode said detected bar code symbol on said detected object, and upon decoding said detected bar code symbol, automatically producing symbol character data representative of said decoded bar code symbol, and upon failing to decode said detected bar code symbol within a predetermined time period, automatically deactivating said programmed microprocessor.

* * * * *